United States Patent
Sawada

(10) Patent No.: US 8,582,033 B2
(45) Date of Patent: Nov. 12, 2013

(54) MOVIE REPRODUCTION SYSTEM AND MOVIE REPRODUCTION METHOD FOR REDUCING DELAY TIME OF REPRODUCED MOVIE

(75) Inventor: Takashi Sawada, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 79 days.

(21) Appl. No.: 13/318,229

(22) PCT Filed: May 17, 2010

(86) PCT No.: PCT/JP2010/058266
§ 371 (c)(1),
(2), (4) Date: Oct. 31, 2011

(87) PCT Pub. No.: WO2010/134482
PCT Pub. Date: Nov. 25, 2010

(65) Prior Publication Data
US 2012/0050614 A1 Mar. 1, 2012

(30) Foreign Application Priority Data

May 22, 2009 (JP) .................................. 2009-123884

(51) Int. Cl.
*H04N 9/475* (2006.01)
(52) U.S. Cl.
USPC .......................................... 348/513; 348/516
(58) Field of Classification Search
USPC .......... 348/512, 513, 516, 521; 375/362, 371, 375/240.28; 370/509, 516, 519; 725/81
See application file for complete search history.

(56) References Cited

U.S. PATENT DOCUMENTS

| | | | | |
|---|---|---|---|---|
| 5,111,292 A | * | 5/1992 | Kuriacose et al. | 375/240.01 |
| 5,559,999 A | * | 9/1996 | Maturi et al. | 713/400 |
| 5,612,981 A | * | 3/1997 | Huizer | 375/376 |
| 6,339,597 B1 | * | 1/2002 | Osaki | 370/395.65 |
| 6,556,626 B1 | * | 4/2003 | Iganami | 375/240.25 |

(Continued)

FOREIGN PATENT DOCUMENTS

| JP | 08-205146 | 8/1996 |
|---|---|---|
| JP | 8 205146 | 8/1996 |

(Continued)

OTHER PUBLICATIONS

International Search Report Issued Aug. 31, 2010 in PCT/JP10/058266 Filed May 17, 2010.

*Primary Examiner* — Victor Kostak
(74) *Attorney, Agent, or Firm* — Oblon, Spivak, McClelland, Maier & Neustadt, L.L.P.

(57) ABSTRACT

After a sending-side clock and a clock 34 of a communication unit 33 on a receiving side are synchronized with each other, the first vertical synchronizing signal is generated in accordance with the sending-side clock, and movie data 5 representing a movie is generated by generating frame data in accordance with the generated first vertical synchronizing signal. Start time data indicating the time for starting generation of the movie data 5 and the movie data 5 are sent as communication data from the sending side to the communication unit 33. Then, the second vertical synchronizing signal is generated in accordance with the clock 34 of the communication unit 33 and the start time data received as the communication data. The frame data 50 included in the movie data 5 received as the communication data is presented in accordance with the second vertical synchronizing signal.

18 Claims, 26 Drawing Sheets

(56) References Cited

U.S. PATENT DOCUMENTS

| | | | |
|---|---|---|---|
| 6,674,477 B1* | 1/2004 | Yamaguchi et al. | 348/387.1 |
| 6,940,822 B1* | 9/2005 | Herfet et al. | 370/252 |
| 7,436,454 B2* | 10/2008 | Yamaguchi et al. | 348/387.1 |
| 7,502,070 B2* | 3/2009 | Yamaguchi et al. | 348/387.1 |
| 2003/0160897 A1* | 8/2003 | Park | 348/498 |
| 2004/0196872 A1* | 10/2004 | Nakamura | 370/512 |
| 2006/0095944 A1* | 5/2006 | Demircin et al. | 725/81 |
| 2007/0162981 A1* | 7/2007 | Morioka et al. | 726/30 |
| 2010/0071010 A1* | 3/2010 | Elnathan et al. | 725/81 |

FOREIGN PATENT DOCUMENTS

| | | |
|---|---|---|
| JP | 10 248066 | 9/1998 |
| JP | 10-248066 | 9/1998 |
| JP | 2000 42247 | 2/2000 |
| JP | 2000-42247 | 2/2000 |
| JP | 2003 37585 | 2/2003 |
| JP | 2003-37585 | 2/2003 |
| JP | 2005-57590 | 3/2005 |
| JP | 2005 57590 | 3/2005 |
| JP | 2007-221441 | 8/2007 |

* cited by examiner

MOVIE REPRODUCTION SYSTEM AND MOVIE REPRODUCTION METHOD FOR REDUCING DELAY TIME OF REPRODUCED MOVIE

TECHNICAL FIELDS

The present invention relates to techniques for sending data representing a movie through communication and reproducing (displaying) the movie on the receiving side. In particular, the present invention relates to techniques for suppressing a time of delay occurring on the receiving side.

BACKGROUND ART

Movie reproduction is achieved by sequentially displaying still images (frames) at a constant time interval (hereinafter, referred to as a "frame interval") by means of an image reproduction apparatus such as a display.

On the other hand, systems have been proposed which convert a movie signal generated by an image generation apparatus into digital data and send it to the image reproduction apparatus set at a remote location through data communication to reproduce it (a broadcasting system, a monitoring system, a TV phone system, a game system, and the like). Like those systems, in a case of using data communication between the image generation apparatus and the image reproduction apparatus, there is a problem that, because size of movie data is relatively large, a delay time is generated between image generation and image reproduction mainly because of delay in transmission. Especially in a case of using wireless data communication, data has to be sent/received within a limited bandwidth and therefore there is an upper limit to the communication rate. Thus, reduction in the delay time is a large problem.

In a game system, for example, it is necessary to change a play screen in accordance with a player's operation, and the play screen is formed by real-time moving pictures generated in accordance with the player's operation. Even if the play screen is reproduced at a constant frame interval (even if the play screen is smoothly and continuously reproduced), when the play screen is presented behind the player's operation, the player feels a feeling of strangeness in operation and this lowers operability. In other words, in specific technical fields, merely reproducing the movie continuously on the reproduction side is not sufficient, but being real-time in the reproduction of movie is further required.

Therefore, various techniques have been conventionally proposed for reducing the aforementioned delay time, and one of them is described in Patent Publication 1, for example.
Patent Publication 1 JP 2007-221411 (A)

DISCLOSURE OF THE INVENTION

Problems to be Solved by the Invention

The conventional technique, however, has a problem that a signal which determines a time of generation of a movie frame and a signal which determines a presentation time of the movie frame are not synchronized with each other.

FIG. 26 is a diagram illustrating the conventional technique. "T" in FIG. 26 indicates a frame interval, and "Fa" and "Fb" indicate times required for processing frame data for frames FA and FB, respectively. The term "process" here includes a process for generating frame data, a process for compressing coding of the frame data, a communication process for sending/receiving the frame data from the generation side to the reproduction side, and a process for decoding the frame data on the reproduction side. The "time required for processing" is time from start of generation of a frame data until reproduction (presentation) of that frame data becomes available. "D1" and "D2" are delay times for the frames FA and FB, respectively.

A vertical synchronizing signal in movie generation is a signal indicating a generation time of data for each frame. The data for each frame is generated at a time at which the vertical synchronizing signal is turned ON. That is, generation of the frame FA is started at time t1 and, after the elapse of time Fa, presentation of the frame FA becomes available at time T1. On the other hand, generation of the frame FB is started at time t2 and, after the elapse of time Fb, presentation of the frame FB becomes available.

Then, the frames which are available to be presented are reproduced when a vertical synchronizing signal for movie reproduction is turned ON. Therefore, the frame FA is reproduced at a time (time $\tau 1$) at which the vertical synchronizing signal for movie reproduction is turned ON after time T1, and the delay time is a time between the time t1 and the time $\tau 1$ (delay time D1). On the other hand, the frame FB is reproduced at a time (time $\tau 3$) at which the vertical synchronizing signal for movie reproduction is turned ON after time T2, and the delay time is a time between the time t2 and the time $\tau 3$ (delay time D2). As is apparent from FIG. 26, the delay time D2 is larger than the delay time D1.

As is apparent from the example of the frame FA shown in FIG. 26, it is desirable that the vertical synchronizing signal for reproduction be turned ON immediately after the processing of data of a frame is completed in order to reduce the delay time to be minimum. In other words, it is ideal that the reproduction time has come when preparation for reproduction of the frame data is completed.

According to conventional techniques, however, the vertical synchronizing signal for movie generation and the vertical synchronizing signal for movie reproduction are not synchronized with each other, as described before. Therefore, the vertical synchronizing signal for generation and the vertical synchronizing signal for reproduction have such a relationship that the reproduction time has come immediately before preparation for reproduction of frame data is completed in some cases, as in the example of the frame FB shown in FIG. 26, causing a problem of increasing the delay time (a problem of generation of a so-called jitter).

The present invention is made in view of the aforementioned problems. It is an object of the present invention to reduce the delay time of the reproduced movie and to improve "being real-time" in a technique for transmitting movie data via communication and reproducing it.

Means for Solving the Problems

In order to solve the aforementioned problems, the invention recited in claim 1 is a movie reproduction system for, while a communication clock provided in a sending means for sending communication data and a communication clock provided in a receiving means for receiving the communication data are synchronized with each other, sending/receiving movie data representing a movie between the sending means and the receiving means and reproducing the movie data, comprising a first signal generation means which generates a first vertical synchronizing signal in accordance with the communication clock of the sending means; and an image generation means for generating frame data in accordance with the first vertical synchronizing signal generated by the first signal generation means, thereby generating movie data representing a movie. The sending means sends, as communication data, start time data indicating a time for starting generation of the movie data by the image generation means and the movie data generated by the image generation means. The system further includes a second signal generation means for generating a second vertical synchronizing signal in accordance with the start time data received as the communication data by the receiving means and the communication clock of the receiving means; and an image reproduction means for, based on the movie data received as the communication data by the receiving means, presenting frame data included in the movie data in accordance with the second vertical synchronizing signal generated by the second signal generation means, thereby reproducing the movie represented by the movie data.

The invention recited in claim 2 is the movie reproduction system recited in claim 1, wherein the sending means sends the communication data of the start time data and the communication data of the movie data separately from each other.

The invention recited in claim 3 is the movie reproduction system recited in claim, wherein a the sending means sends the communication data of the start time data with giving higher priority thereto than to the communication data of the movie data.

The invention recited in claim 4 is the movie reproduction system for sending/receiving movie data representing a movie between a sending means for sending communication data and a receiving means for receiving the communication data, and for reproducing the movie, a first signal generation means for generating a first vertical synchronizing signal; and an image generation means for generating frame data in accordance with the first vertical synchronizing signal generated by the first signal generation means, thereby generating movie data representing a movie, wherein the sending means sends, as communication data, frame timing data indicating a time for starting generation of each frame data by the image generation means and the movie data. The system further includes: a second signal generation means for generating a second vertical synchronizing signal in accordance with the frame timing data received as the communication data by the receiving means; and an image reproduction means for presenting frame data included in the movie data received as the communication data by the receiving means in accordance with the second vertical synchronizing signal generated by the second signal generation means, thereby reproducing the movie represented by the movie data.

The invention recited in claim 5 is the movie reproduction system recited in claim 4, wherein the sending means sends the communication data of the frame timing data and the communication data of the movie data separately from each other.

The invention recited in claim 6 is the movie reproduction system recited in claim 5, wherein the sending means sends the communication data of the frame timing data with giving higher priority thereto than to the communication data of the movie data.

The invention recited in claim 7 is the movie reproduction system recited in claim 4, wherein the movie data received as the communication data by the receiving means is also used as the frame timing data, and the second generation means generates a second vertical synchronizing signal in accordance with a receiving time of the movie data.

The invention recited in claim 8 is the movie reproduction system recited in claim 7, wherein the movie data also used as the frame timing data is a leading portion of the movie data.

The invention recited in claim 9 is the movie reproduction system recited in claim 4, wherein the image reproduction means is capable of presenting the frame data included in the movie data even when the number of clocks in the second vertical synchronizing signal for each frame is changed, and the second signal generation means generates the second vertical synchronizing signal while controlling the second vertical synchronizing signal, by increasing/reducing the number of the clocks in the second vertical synchronizing signal for each frame.

The invention recited in claim 10 is the movie reproduction system recited in claim 4, further comprising a sending-side timer and a receiving-side timer, wherein the frame timing data includes a value of the sending-side timer, and the second signal generation means generates the second vertical synchronizing signal in accordance with the value of the sending-side timer included in the frame timing data and a value of the receiving-side timer.

The invention recited in claim 11 is a movie reproduction method for reproducing a movie, comprising the steps of: (a) synchronizing a communication clock of a sending means and a communication clock of a receiving means with each other; (b) after executing the step (a), generating a first vertical synchronizing signal in accordance with the communication clock of the sending means; (c) generating movie data representing the movie by generating frame data in accordance with the first vertical synchronizing signal; (d) sending, as communication data, start time data indicating a time for starting generation of the movie data and the movie data to the receiving means by the sending means; (e) receiving the communication data sent by the sending means by receiving means; (f) generating a second vertical synchronizing signal in accordance with the communication clock of the receiving means and the start timing data received as the communication data by the receiving means; and (g) reproducing the movie represented by the movie data by presenting frame data included in the movie data received as the communication data by the receiving means in accordance with the second vertical synchronizing signal.

The invention recited in claim 12 is a movie reproduction method for reproducing a movie, comprising the steps of: (a) generating a first vertical synchronizing signal; (b) generating movie data representing the movie by generating frame data in accordance with the first vertical synchronizing signal; (c) sending, as communication data, frame timing data indicating a time for starting generation of frame data for each frame constituting the movie data and the movie data; (d) receiving the sent communication data; (e) generating a second vertical synchronizing signal in accordance with the frame timing data received as the communication data; and (f) reproducing the movie represented by the movie data by presenting the frame data included in the movie data received as the communication data in accordance with the second vertical synchronizing signal.

Effects of the Invention

The invention recited in claims 1 to 3 is a movie reproduction system for, while a communication clock provided in a sending means for sending communication data and a communication clock provided in a receiving means for receiving the communication data are synchronized with each other, sending/receiving movie data representing a movie between the sending means and the receiving means and reproducing the movie. This system sends, as communication data, start time data indicating a time for starting generation of the movie data by an image generation means and the movie data generated by the image generation means, and generates the second vertical synchronizing signal in accordance with the start time data received as the communication data and the communication clock of the receiving means. Thus, the first vertical synchronizing signal and the second vertical synchronizing signal are synchronized with each other and therefore a delay time is shortened.

The invention recited in claim 2 sends the communication data of the start time data and the communication data of the movie data separately from each other. Thus, a delay time of the start time data can be shortened as compared with a case where the start time data is sent together with the movie data which has a relatively large delay time. Therefore, the accuracy of the second vertical synchronizing signal which should satisfy a predetermined condition is improved.

The invention recited in claim 3 sends the communication data of the start time data with giving higher priority to it than to the communication data of the movie data. Thus, the delay time of the start time data can be further shortened. Therefore, the accuracy of the second vertical synchronizing signal which should satisfy the predetermined condition is further improved.

The invention recited in claims 4 to 10 sends, as communication data, frame timing data indicating a time for starting generation of frame data for each frame by an image generation means and movie data, and generates the second vertical synchronizing signal in accordance with the frame timing data received as the communication data. Thus, the first vertical synchronizing signal and the second vertical synchronizing signal are synchronized with each other and therefore a delay time is shortened.

The invention recited in claim 6 sends the communication data of the frame timing data with giving higher priority to it than to the communication data of the movie data. Thus, the delay time of the frame timing data can be shortened. Therefore, the accuracy of the second vertical synchronizing signal which should satisfy a predetermined condition is further improved.

The invention recited in claim 7 uses the movie data received as the communication data by the receiving means as the frame timing data, and the second signal generation means generates the second vertical synchronizing signal in accordance with the receiving time of the movie data. Thus, it is not necessary to send the frame timing data as separate communication data.

In the invention recited in claim 8, the movie data which is also used as the frame timing data is a leading portion of the movie data. Thus, the portion which has a relatively small delay time error can be used as the frame timing data and therefore the accuracy is improved.

The invention recited in claim 9 controls the second vertical synchronizing signal by increasing/reducing the number of clocks in the second vertical synchronizing signal for each frame. Thus, it is possible to use inexpensive hardware and it is easy to control the second vertical synchronizing signal.

The invention recited in claim 10 further includes a sending-side timer and a receiving-side timer. The frame timing data contains a value of the sending-side timer, and the second vertical synchronizing signal is generated in accordance with the value of the sending-side timer included in the frame timing data and a value of the receiving-side timer. Thus, effects of time required for sending/receiving the frame timing data can be suppressed.

The invention recited in claim 11 includes the steps of: synchronizing a communication clock of a sending means and a communication clock of a receiving means with each other; generating the first vertical synchronizing signal in accordance with the communication clock of the sending means; sending, as communication data, start time data indicating a time for starting generation of movie data and the movie data to the receiving means by the sending means; and generating the second vertical synchronizing means in accordance with the communication clock of the receiving means and the start time data received as the communication data by the receiving means. Thus, the first vertical synchronizing signal and the second vertical synchronizing signal are synchronized with each other and therefore a delay time is shortened.

The invention recited in claim 12 includes the steps of: sending, as communication data, frame timing data indicating a time for starting generation of frame data for each frame constituting movie data and the movie data; and generating the second vertical synchronizing signal in accordance with the frame timing data received as the communication data. Thus, the first vertical synchronizing signal and the second vertical synchronizing signal are synchronized with each other and therefore a delay time is shortened.

BRIEF DESCRIPTION OF THE DRAWINGS

FIG. 22 is a block diagram showing the structure of the extension unit in the fifth embodiment.

Figure 1:
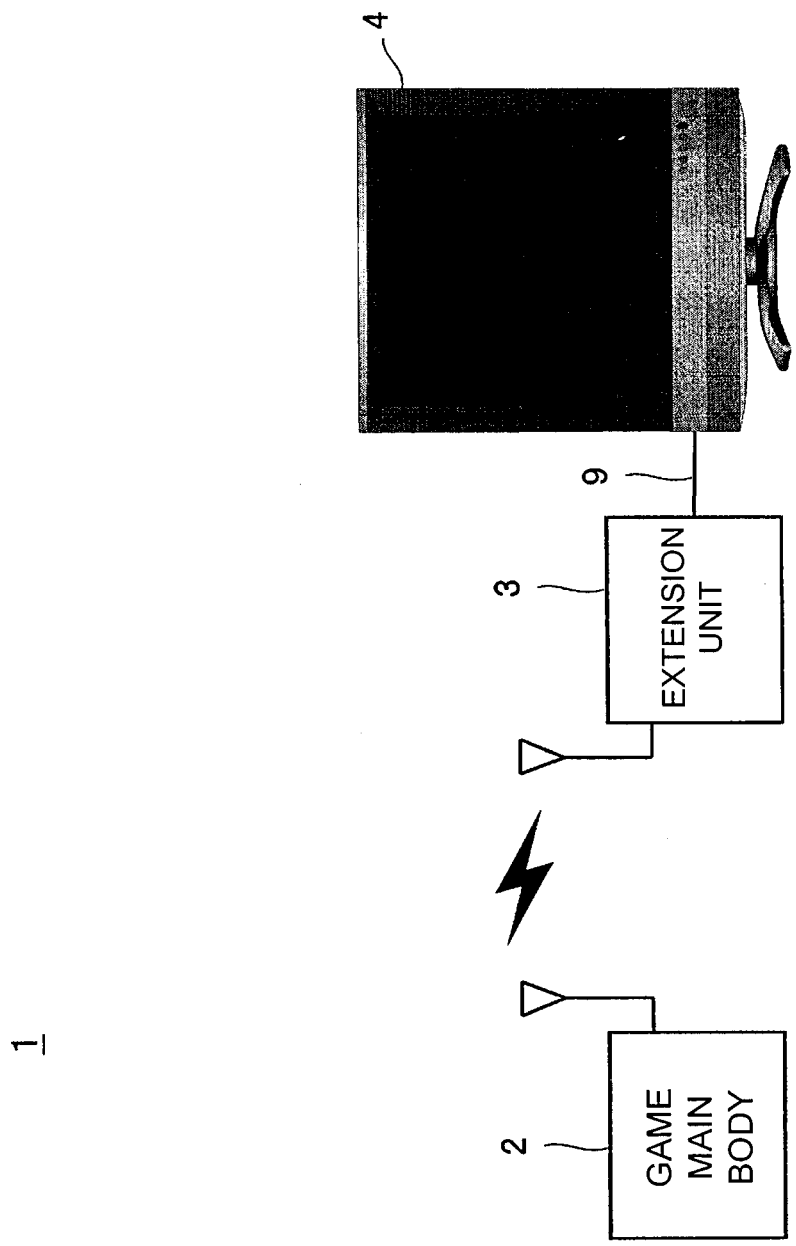
FIG. 1 is a diagram showing the structure of a movie reproduction system according to the present invention.

DESCRIPTION OF REFERENCE SIGNS 1, 1a a movie reproduction system
2 a game main body
23 a communication unit (a sending means)
230 a timer (a sending-side timer)
24, 24a a image processor unit
25 a encoder
26, 34 a clock (a communication clock)
27, 37, 38 a clock
3, 3a a extension unit
310 a setting data
33 a communication unit (a receiving means)
330 a timer (a receiving-side timer)
35, 35a, 35b, 35c a decoder
355 a timer
356, 359 a comparator
39 a liquid crystal display
4 a TV receiver
5 a movie data 5
50 a frame data

BEST MODE FOR CARRYING OUT THE INVENTION

The embodiments of the present invention are described in detail below, referring to the accompanied drawings.

1. First Embodiment

FIG. 1 is a diagram showing the structure of a movie reproduction system 1 according to the present invention. The movie reproduction system 1 is arranged as a system which is formed by a game main body 2, an extension unit 3, a TV receiver 4, and a cable 9 and which wirelessly sends/receives a movie between the game main body 2 and the extension unit 3 and reproduces the movie on the TV receiver 4.

Figure 2:
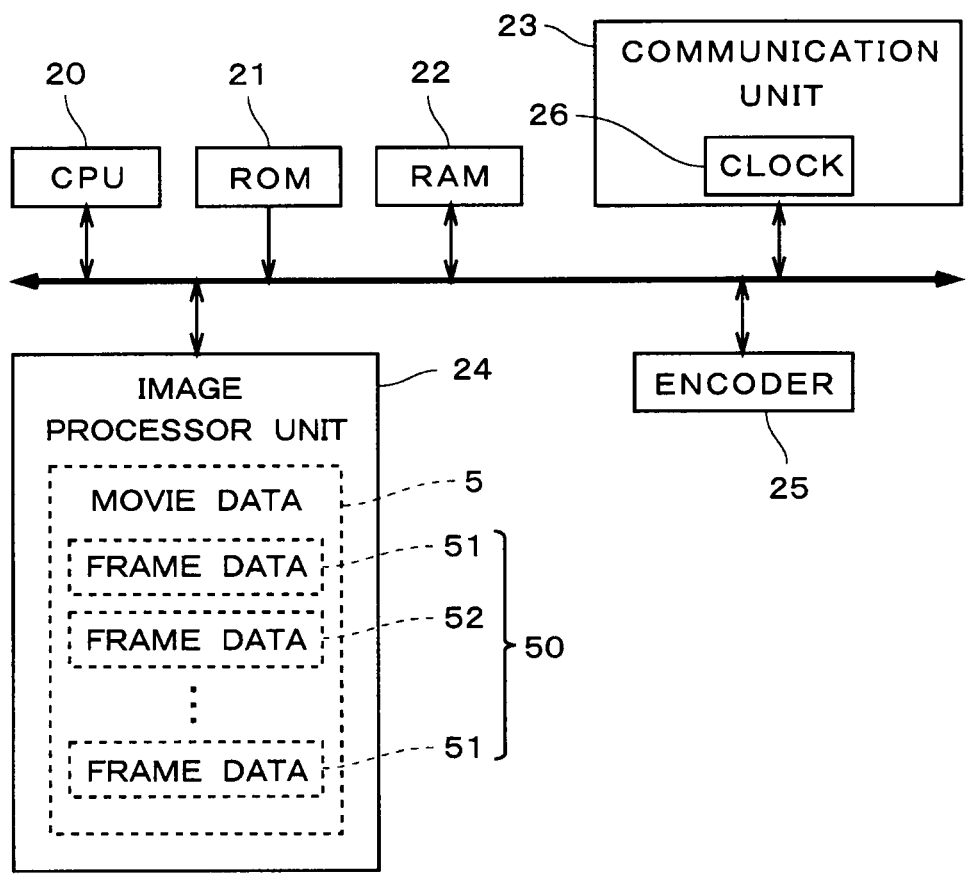
FIG. 2 is a block diagram showing the structure of the game main body in the first embodiment.

FIG. 2 is a block diagram showing the structure of the game main body 2 in the first embodiment. The game main body 2 includes a CPU 20 for performing calculation of various kinds of data and generation of control signals, a read-only ROM 21 in which data such as a start-up program is stored, and a RAM 22 used as a temporal working area of the CPU 20.

Although not shown in FIG. 2, the game main body 2 includes: a reader unit for reading game programs (data supplied while being stored in a medium such as a CD-ROM, a cartridge, and a memory card); an input unit used by a player (an operator) for inputting data, e.g., a controller; a display unit for presenting various data to the player, and the like. Thus, the game main body 2 has functions of a general computer.

The game main body 2 also includes a communication unit 23, an image processor unit 24, and an encoder 25, as shown in FIG. 2.

The communication unit 23 includes a clock 26, as shown in FIG. 2. The clock 26 is a circuit (clock generator) for generating a signal used as the basis of the frequency of a radio wave which is sent out for communication by the communication unit 23. That is, the clock 26 is a communication clock of a sending means in the present invention.

In wireless communication, communication is carried out while a sending side and a receiving side are synchronized with each other. Therefore, the clock 26 has to be synchronized with a communication clock of the extension unit 3 (clock 34 in FIG. 3), and includes an oscillator having a variable oscillating frequency and a control circuit for controlling the oscillator.

As the oscillator included in the clock 26, a voltage controlled oscillator can be used. The clock 26 in this embodiment includes a VCXO (Voltage Controlled Xtal Oscillator) which adapts a crystal oscillator as a resonator, but is not limited thereto. The clock 26 may be an oscillator including a ceramic resonator or a SAW (Surface Acoustic Wave) resonator, for example. That is, any structure can be used as long as the oscillating frequency can be controlled.

As the method for synchronizing the clock 26 of the game main body 2 and the clock 34 of the extension unit 3 with each other, an appropriate technique can be used which has been conventionally proposed in wireless communication. Therefore, the detailed description thereof is omitted. Hereinafter, the description is made assuming that the clock 26 and the clock 34 have been already synchronized with each other unless otherwise described.

The communication unit 23 has a function of sending communication data (detailed later) to the extension unit 3 wirelessly. That is, the communication unit 23 mainly corresponds to a sending means in the present invention. As the communication unit 23, the movie reproduction system 1 in this embodiment uses a structure which implements WiFi (Wireless Fidelity) specification conventionally proposed.

Although the details are not shown, the image processor unit 24 includes a circuit for generating a first vertical synchronizing signal which is synchronized with a clock signal input from the clock 26 and which has a period corresponding to a frame interval. More specifically, that circuit divides the frequency of the aforementioned clock signal input to the image processor unit 24 such that the period is equal to the frame interval, thereby generating the first vertical synchronizing signal. In this manner, the clock 26 and the first vertical synchronizing signal are synchronized with each other (synchronization is ensured). That is, the image processor unit 24 has a function of generating the first vertical synchronizing signal in accordance with the clock signal from the clock 26, and has a function of the first signal generation means in the present invention.

The image processor unit 24 generates frame data 50 (each data unit represents one frame) at a fixed time interval (frame interval) in accordance with the first vertical synchronizing signal generated by the above circuit. The frame data 50 sequentially generated at the fixed frame interval is uncompressed stream data. A frame is a still image presented on one screen on the TV receiver 4. Therefore, each unit of the frame data 50, which is data before being encoded by the encoder 25 described later, has the same data amount as other unit of the frame data 50.

In this embodiment, movie data 5 is formed by arranging a plurality of units of frame data 50 in an order of generation of the frame data 50. That is, the image processor unit 24 has a function of an image generation means in the present invention. Please note that, in some cases, the first one (the leading one in chronological order) of a plurality of units of frame data 50 forming movie data 5 is referred to as frame data 51 and other units of frame data 50 than the frame data 51 are referred to frame data 52, as shown in FIG. 2. Moreover, FIG. 2 shows that the movie data 5 is accumulated and stored in the image processor unit 24 for convenience of illustration, but actually every partial image data which has been generated (data having the amount corresponding to various processes to be executed) is sequentially output to the encoder 25.

Furthermore, the image processor unit 24 in this embodiment outputs a time of generation of the frame data 51 (the first frame data 50 of the movie data 5) to the communication unit 23. In other words, the image processor unit 24 begins generation of the movie data 5 in accordance with the first vertical synchronizing signal and also notifies the communication unit 23 of the start time of generation of the movie data 5.

In response to this notification, start time data indicating the start time of generation of the movie data 5 by the image processor unit 24 is generated by the communication unit 23 as communication data. The communication data of the start time data is wirelessly sent to the extension unit 3 separately from communication data generated from the movie data 5.

The communication unit 23 gives higher priority to the communication data of the start time data than to the communication data of the movie data 5, and sends it. Thus, a delay time of the communication data of the start time data is reduced as compared with a delay time of the communication data of the movie data 5, and reproducibility of a time period required from generation of the first vertical synchronizing signal until the first vertical synchronizing signal is received by the extension unit 3 is improved. Therefore, an expected delay time can be expected with high precision.

The encoder 25 sequentially encodes the movie data 5 generated by the image processor unit 24 and outputs it to the communication unit 23. For coding by the encoder 25, methods such as MPEG2, MPEG4, H.263, or H.264 have been proposed, for example. However, coding by the encoder 25 is not limited to any of those methods. Coding by the encoder 25 compresses the data amount of the movie data 5.

The movie data 5 which is generated by the encoder 25 and input to the communication unit 23 is wirelessly sent as communication data by the communication unit 23 to the extenuation unit 3.

The description of the structure and functions of the game main body 2 are made above. Next, the extension unit 3 and the TV receiver 4 are described.

Figure 3:
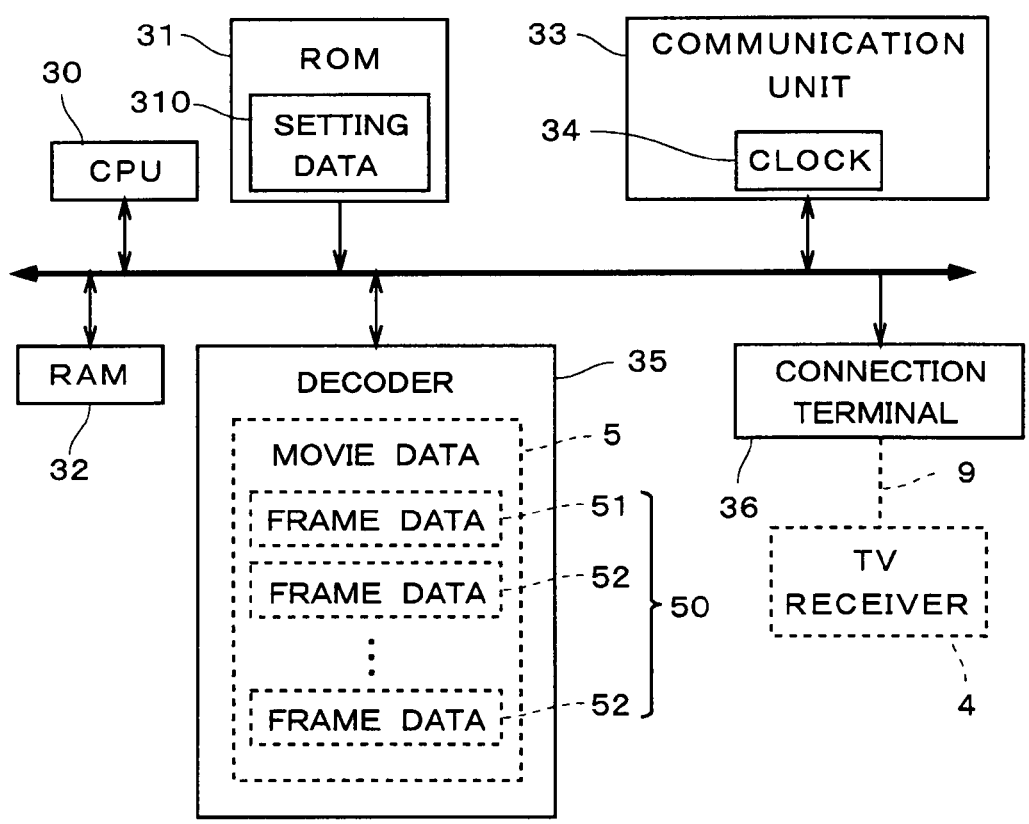
FIG. 3 is a block diagram showing the structure of the extension unit in the first embodiment.

FIG. 3 is a block diagram showing the structure of the extension unit 3 in the first embodiment. The extension unit 3 includes a CPU 30 for performing calculation of various kinds of data and generation of control signals, a read-only ROM 31 in which data such as a start-up program and setting data 310 are stored, and a RAM 32 used as a temporal working area of the CPU 30.

The setting data 310 shown in FIG. 3 is an expected value of a time (process time) from start of generation of one frame data 50 in the image processor unit 24 to completion of decoding of that frame data 50 in a decoder 35. The setting data 310 is obtained in advance through experiments or the like in accordance with the image quality of the movie data 5, a communication rate of wireless communication, and the like, and is stored in the ROM 31.

Although not shown in FIG. 3, the extension unit 3 includes an operation unit to be operated by a player (an operator), e.g., a controller and buttons, and a display unit presenting various kinds of data to the player, e.g., a lamp or an LED. That is, the extension unit 3 has functions of a general computer.

Moreover, the extension unit 3 includes a communication unit 33, a decoder 35, and a connection terminal 36, as shown in FIG. 3.

The communication unit 33 includes a clock 34. The clock 34 has the same structure and function as the clock 26 of the game main body 2, and is synchronized with the clock 26 as described before.

The communication unit 33 also provides a function of enabling the extension unit 3 to perform data communication with the game main body 2. In particular, the communication unit 33 has a function of receiving communication data wirelessly sent from the communication unit 23 of the game main body 2.

That is, the communication unit 33 mainly corresponds to a receiving means in the present invention, and the clock 34 corresponds to a communication clock of the receiving means in the present invention. The movie reproduction system 1 in this embodiment uses the structure implementing WiFi standard conventionally proposed as the communication unit 33 like the communication unit 23 described above.

In this embodiment, the destination of the communication data received by the communication unit 33 is determined by the CPU 30 in accordance with a result of classification of the communication data performed by the CPU 30. The CPU 30 also controls the communication unit 33. Therefore, the classification of the communication data received by the communication unit 33 into the start time data, the movie data 5, and other kinds of data is carried out by the CPU 30. However, a dedicated determination circuit for determining whether or not the communication data is the start time data may be provided in the communication unit 33 or the decoder 35 so as to carry out determination at a time at which the communication data is stored into a receiving buffer of the communication unit 33 or an input buffer of the decoder 35.

In a case where the communication unit 33 has received the communication data of the start time data, the CPU 30 outputs a signal (hereinafter, referred to as a "timing signal") to the decoder 35 at that time. Also, the communication unit 33 outputs the encoded movie data 5 received as the communication data to the decoder 35 in accordance with control by the CPU 30.

The decoder 35 in this embodiment includes a delay circuit (not shown) for generating a delay signal obtained by delaying the timing signal input from the CPU 30 by the expected value indicated by the setting data 310. The decoder 35 generates a signal having the frequency corresponding to the frame interval as a preliminary vertical synchronizing signal at a time at which the delay signal turns ON (only once in this embodiment). Moreover, the decoder 35 synchronizes the preliminary vertical synchronizing signal with the clock signal of the clock 34 to generate the second vertical synchronizing signal.

That is, the decoder 35 generates the second vertical synchronizing signal in accordance with the start time data received as the communication data by the communication unit 33 and the clock signal of the clock 34 of the communication unit 33. Therefore, the decoder 35 has a function of a second signal generation means in the present invention.

It is described that intermediate signals such as the "delay signal" and the "preliminary vertical synchronizing signal" are generated by the decoder 35 in this embodiment for the sake of convenience. However, those signals are not signals which always have to be generated. All that is required is to generate, as the second vertical synchronizing signal, a signal which has the same frequency as the first vertical synchronizing signal (which is to be a signal at the frame interval), is delayed from the first vertical synchronizing signal by a predetermined time in accordance with the expected value, and is synchronized with the clock signal of the clock 34 (the clock signal of the clock 26) with using the timing signal (start time data), the setting data 310 (the expected value) and the frame interval as inputs. In practice, the decoder 35 generates the second vertical synchronizing signal by dividing the frequency of the clock signal of the clock 34 in accordance with the aforementioned conditions. In this manner, the clock 34 and the second vertical synchronizing signal are synchronized with each other (synchronization is ensured).

In addition, the decoder 35 has a function of decoding the communication data (encoded movie data 5) input from the communication unit 33 into the movie data 5 representing a play screen (movie) in a game.

FIG. 3 shows that the movie data 5 is accumulated and stored in the decoder 35 for convenience of illustration, but the movie data 5 is sequentially output on a frame data 50 basis from the connection terminal 36 to the TV receiver 4 via the cable 9 in accordance with the second vertical synchronizing signal.

The connection terminal 36 is arranged to allow insertion of a plug provided at one end of the cable 9 thereinto, and forms an output terminal for a signal from the extension unit 3. That is, a dedicated cable 9 electrically connects the extension unit 3 and the TV receiver 4 to each other and transfers movie data 5 from the extension unit 3 to the TV receiver 4.

The TV receiver 4 in this embodiment is a general TV set for household use and the detailed description is omitted. The TV receiver 4 has the structure and functions for receiving television broadcasts and watching them. Moreover, the TV receiver 4 is provided with an input terminal which is not shown, and is arranged to allow insertion of a plug provided at one end of the cable 9 into that input terminal.

To the TV receiver 4, the movie data 5 decoded by the decoder 35 is input from the extension unit 3 via the cable 9. The TV receiver 4 then reproduces (presents) a movie represented by that movie data 5 on a screen based on the movie data 5 input from the extension unit 3.

The description of the structure and functions of the movie reproduction system 1 in the first embodiment is made above. Next, a movie reproduction method for reproducing a movie by using the movie reproduction system 1 is described.

Figure 4:
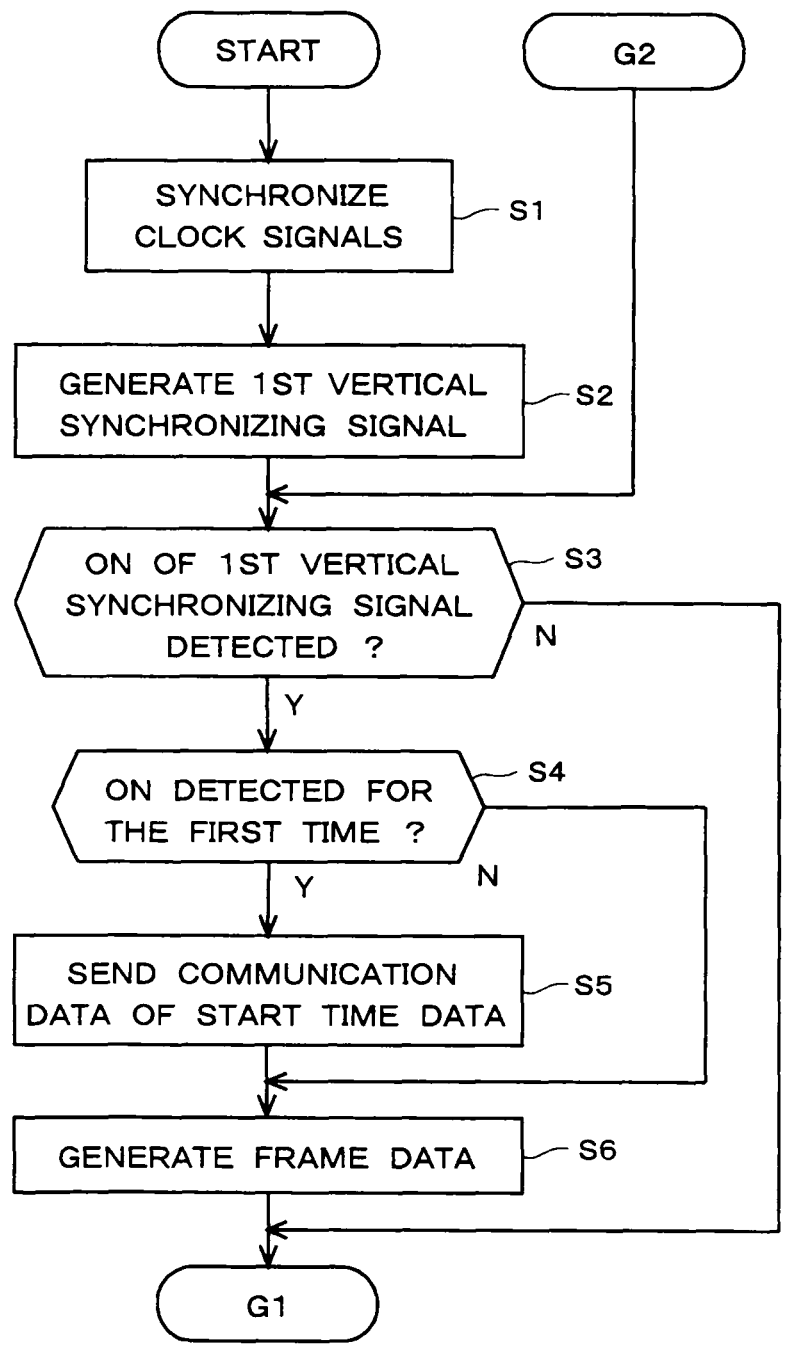
FIG. 4 is a flowchart showing an operation of the game main body in the first embodiment.
Figure 5:
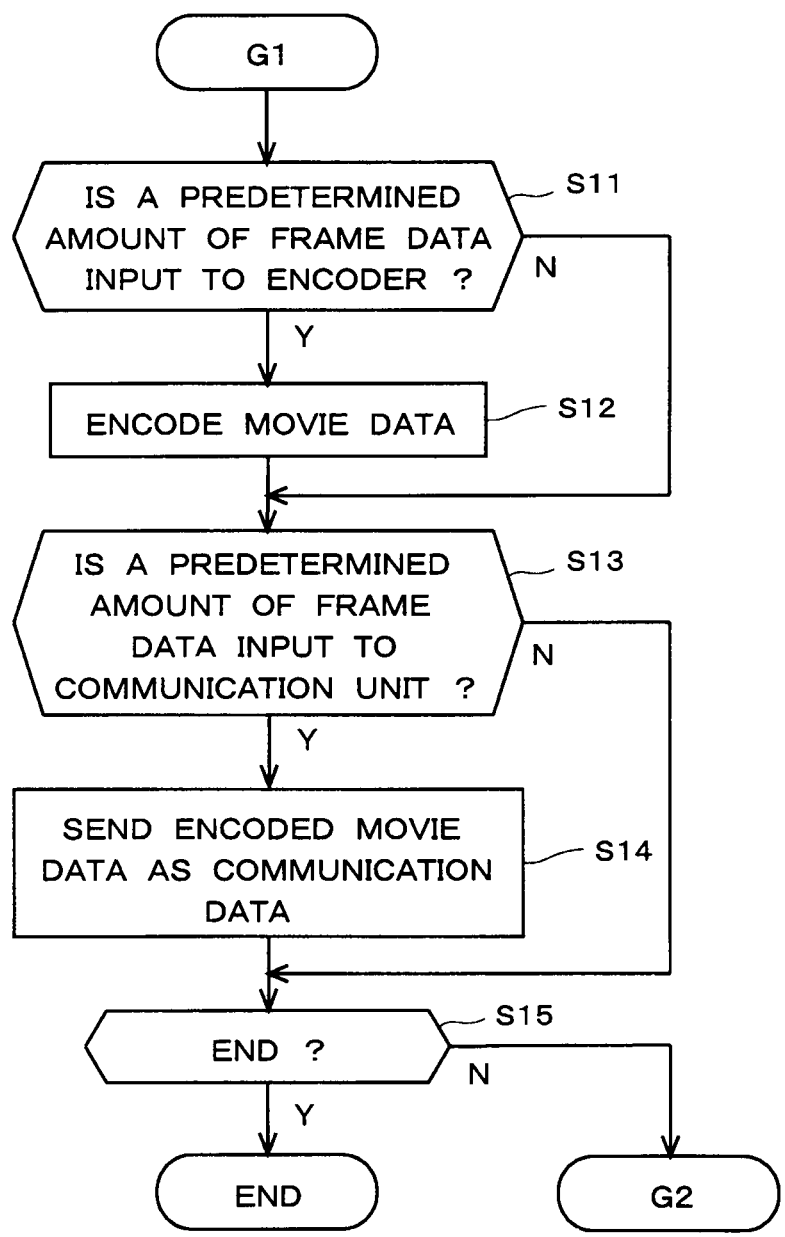
FIG. 5 is a flowchart showing an operation of the game main body in the first embodiment.

FIGS. 4 and 5 are flowcharts showing an operation of the game main body 2 in the first embodiment. FIGS. 4 and 5 show that steps are sequentially executed for convenience of illustration. In practice, however, the steps may be carried out simultaneously and in parallel in hardware components in an appropriate manner. This is the same for flowcharts referred to later.

First, the game main body 2 executes a predetermined procedure to synchronize the clock signal of the clock 26 and the clock signal of the clock 34 with each other, when a power is turned on (Step S1). As described before, a conventional technique can be appropriately used for the process in Step S1.

When the clock signal of the clock 26 on the sending side and the clock signal of the clock 34 on the receiving side are placed in a synchronized state, the image processor unit 24 generates the first vertical synchronizing signal which is in synchronization with the clock signal of the clock 26 and is turned ON at the frame interval (time T), in accordance with the clock signal input from the clock 26 (Step S2). More specifically, at least after Step S2 is executed, the first vertical synchronizing signal is continuously generated by dividing the frequency of the clock signal of the clock 26.

When generating the first vertical synchronizing signal, the image processor unit 24 is placed in a state where it monitors ON state of the first vertical synchronizing signal (Step S3). Moreover, when Step S2 is executed, the encoder 25 is placed in a state for monitoring whether or not a predetermined amount of frame data 50 is input from the image processor unit 24 (Step S11). Similarly, when Step S2 is executed, the communication unit 23 is placed in a state for monitoring whether or not a predetermined amount of frame data 50 is input from the encoder 25 (Step S13).

In a case where the ON state of the first vertical synchronizing signal has been detected, the image processor unit 24 determines to be Yes in Step S3 and further determines whether or not the detected ON state is the first time (Step S4).

In a case where the detected ON state is the first time (Yes in Step S4), the image processor unit 24 notifies the communication unit 23 of this time. Thus, the time for starting generation of movie data 5 is notified to the communication unit 23, and the communication unit 23 generates communication data of the start time data and sends it to the extension unit 3 (Step S5). Please note that the communication unit 23 gives higher priority to the communication data to be sent in Step S5.

In parallel with the processes in Steps S4 and S5, the image processor unit 24 generates frame data 50 (Step S6). More specifically, generation of frame data 50 of a certain frame is started by Step S6. Thus, the frame data 50 generated by the image processor unit 24 is input to the encoder 25.

As is apparent from FIG. 4, the process in Step S6 is executed every time the first vertical synchronizing signal is turned ON. As described above, the first vertical synchronizing signal is a signal which is turned ON at the frame interval. Therefore, the frame data 50 is generated by the image processor unit 24 at the frame interval. In this manner, the image processor unit 24 generates the frame data 50 in accordance with the first vertical synchronizing signal, thereby generating movie data 5 representing a movie.

When the frame data 50 is generated by the image processor unit 24 and a predetermined amount of frame data 50 is input to the encoder 25, the encoder 25 determines to be Yes in Step S11 and encodes the predetermined amount of frame data 50 input thereto (i.e., movie data 5) (Step S12).

The encoder 25 in this embodiment carries out encoding on a basis of data representing an image formed by 16 pixels×16 pixels of the frame data 50 (hereinafter, referred to as a "macro block"), and outputs the encoded data to the communication unit 23. Please note that the predetermined amount is not limited that size.

When encoding of the frame data 50 by the encoder 25 is carried out and the predetermined amount of frame data 50 is input to the communication unit 23, the communication unit 23 determines to be Yes in Step S13 and sends the movie data 5 input thereto to the extension unit 3 as communication data (Step S14).

Every time one macro block of the frame data 50 is input from the encoder 25 to the communication unit 23, the communication unit 23 in this embodiment sends it as the communication data.

The CPU 20 of the game main body 2 monitors whether or not the end is instructed by a user's operation or the like (Step S15), and repeats the processes from Steps S3 to S6 and Steps S11 to S15 until the end is instructed.

By repeating the processes from Steps S3 to S6 and S11 to S15 in this manner, generation of movie data 5 by the image processor unit 24, encoding by the encoder 25, and transmission by the communication unit 23 are continuously performed sequentially, simultaneously and in parallel. Thus, movie data 5 representing a play screen is generated in the game main body 2 and is sent to the extension unit 3.

When the end is instructed, the CPU 20 of the game main body 2 determines to be Yes in Step S15 and terminates all the processes.

The operation of the game main body 2 executing the movie reproduction method in the first embodiment is described above. Next, an operation of the extension unit 3 is described.

Figure 6:
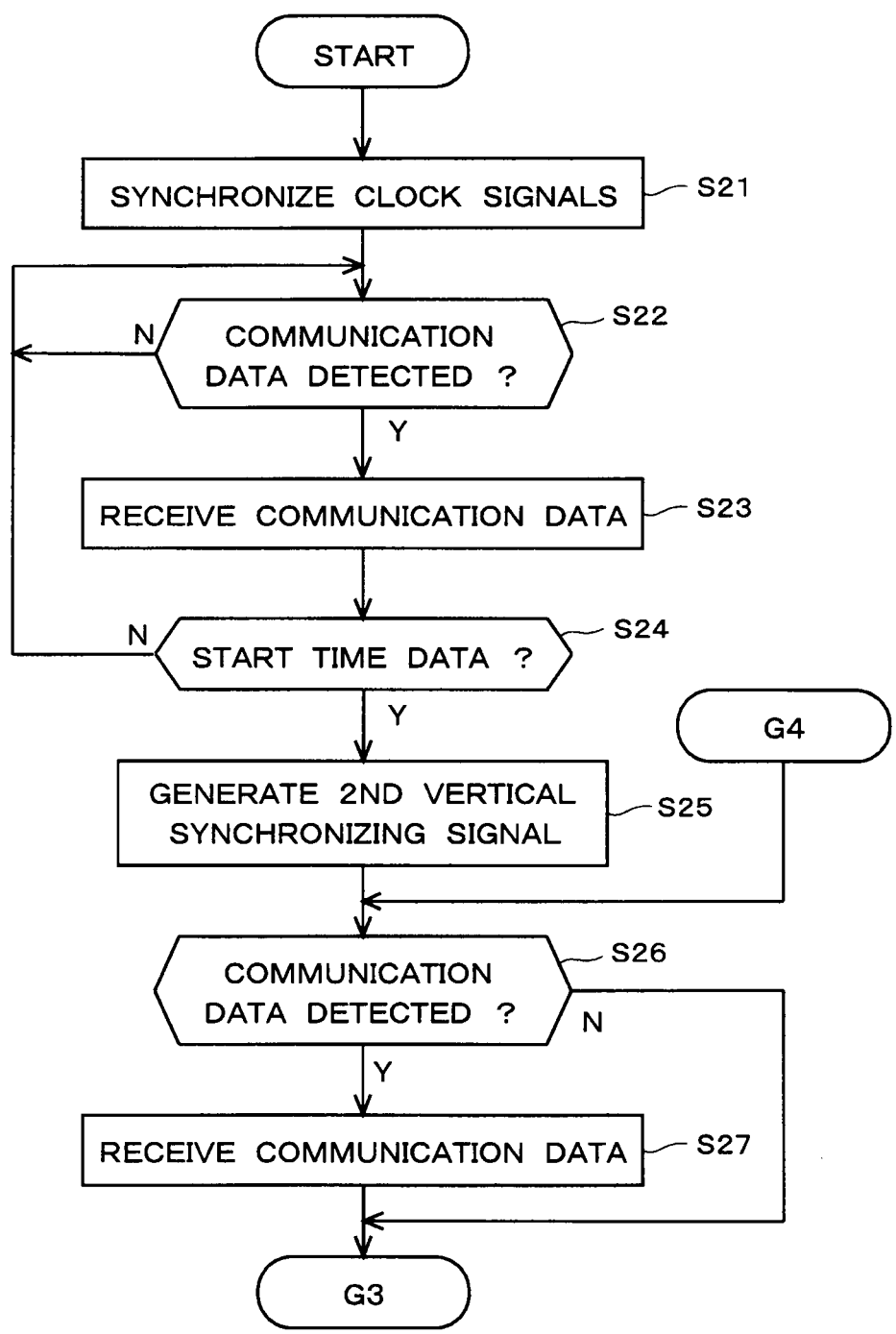
FIG. 6 is a flowchart showing operations of the extension unit and the TV receiver in the first embodiment.
Figure 7:
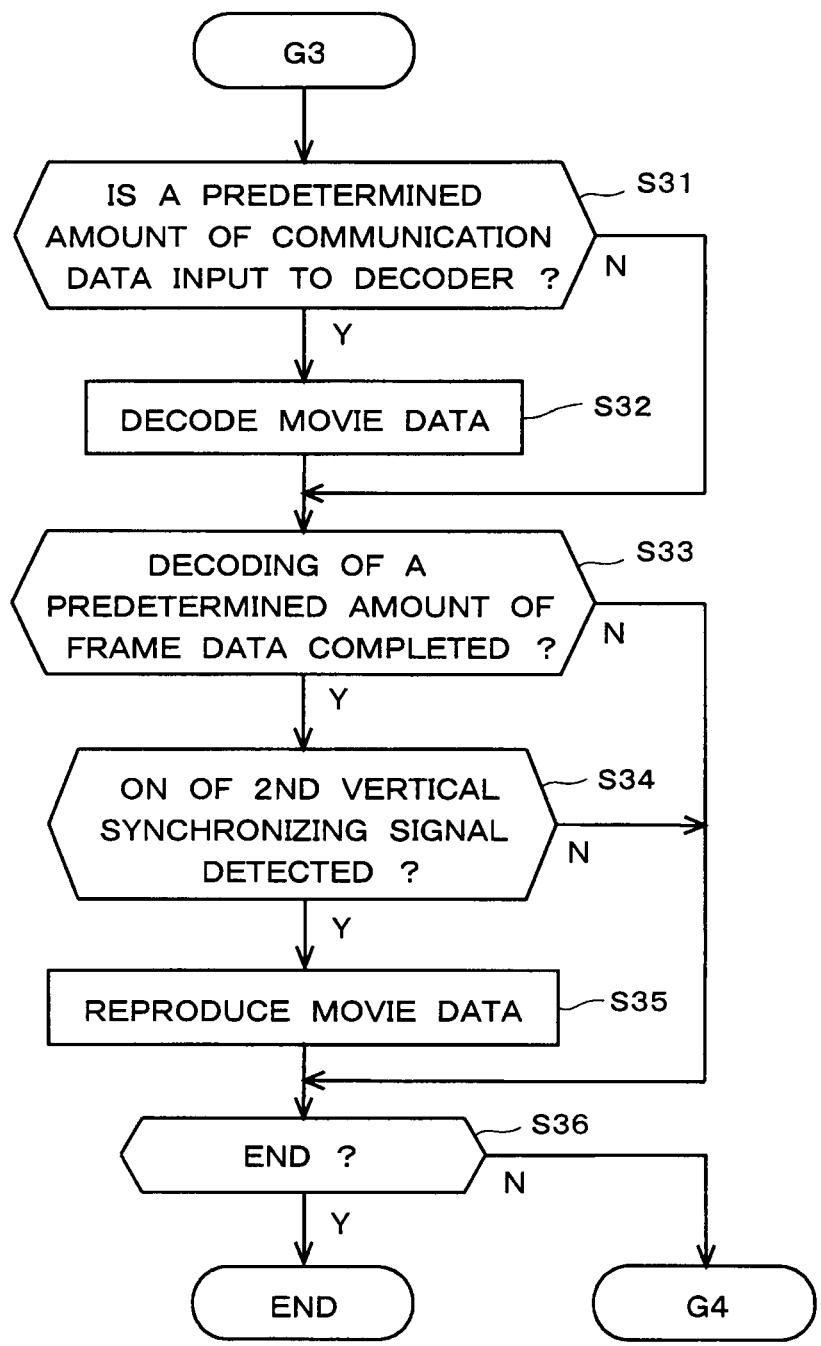
FIG. 7 is a flowchart showing operations of the extension unit and the TV receiver in the first embodiment.

FIGS. 6 and 7 are flowcharts showing operations of the extension unit 3 and the TV receiver 4 in the first embodiment.

The extension unit 3 executes a predetermined procedure with the game main body 2 and synchronizes the clock signal of the clock 26 and the clock signal of the clock 34 with each other, when a power is turned on (Step S21). As described before, a conventional technique can be appropriately used for the process in Step S21.

When the clock signal of the clock 34 on the receiving side and the clock signal of the clock 26 on the sending side are placed in a state where they are in synchronization with each other, the extension unit 3 is placed in a standby state until it receives communication data (Step S22).

When detecting that the communication data has been sent in this state (Yes in Step S22), the communication unit 33 receives the communication data which has been sent (Step S23).

The CPU 30 then determines whether or not the communication data received by the communication unit 33 in Step S23 is start time data (Step S24). If it is not the communication data of the start time data, the flow goes back to Step S22 to repeat the processes. On the other hand, in a case where the received communication data is the start time data, the CPU 30 outputs a timing signal to the decoder 35.

When the CPU 30 outputs the timing signal, the decoder 35 generates the second vertical synchronizing signal based on the timing signal input thereto, the expected value indicated by the setting data 310, and the clock signal of the clock 34 (Step S25). Thereafter, the decoder 35 generates the second vertical synchronizing signal synchronized with the clock signal of the clock 34 while dividing the frequency of the clock signal of the clock 34.

As described before, the first vertical synchronizing signal is generated by dividing the frequency of the clock signal of the clock 26. Therefore, the clock signal of the clock 26 and the first vertical synchronizing signal are in synchronization with each other. Moreover, the second vertical synchronizing signal is generated by dividing the frequency of the clock signal of the clock 34 as described above, and therefore the clock signal of the clock 34 and the second vertical synchronizing signal are in synchronization with each other. Furthermore, the clock signal of the clock 26 and the clock signal of the clock 34 are synchronized with each other in accordance with a wireless communication procedure. Therefore, the first vertical synchronizing signal and the second vertical synchronizing signal are in synchronization with each other.

The movie reproduction system 1 cannot reproduce frames of the movie data 5 at the frame interval without executing Step S25 for generating the second vertical synchronizing signal. Therefore, the movie reproduction system 1 repeats the processes from Step S22 to S24 and waits for reception of the start time data as the communication data (until it is determined to be Yes in Step S24).

In this waiting period, the movie reproduction system 1 cannot reproduce the movie data 5. However, the start time data is generated at the time at which generation of the movie data 5 is started, and has a small data size and therefore does not require a long communication time. In addition, the start time data is transmitted/received prior to other communication data. Therefore, it is expected that the aforementioned waiting period is generally short and the extension unit 3 receives the start time data before receiving the movie data 5. Please note that, also in this waiting period, an image or a movie prepared in the extension unit 3 may be presented on the TV receiver 4 by a unique vertical synchronizing signal.

When Step S25 is executed and the second vertical synchronizing signal is generated, the communication unit 33 is placed in a state for monitoring arrival of communication data again (Step S26). The decoder 35 is placed in a state for monitoring whether or not a predetermined amount of communication data is input from the communication unit 33 (Step S31) and whether or not decoding of a predetermined amount of frame data is completed (Step S33).

When the communication unit 33 detects arrival of communication data while monitoring the arrival of communication data by Step S26, the communication unit 33 receives the communication data arrived (Step S27). More specifically, the communication unit 33 starts receiving of the communication data by Step S27 and also starts outputting the received communication data to the decoder 35. The communication data received in Step S27 is mainly encoded movie data 5, but is not limited thereto.

A predetermined amount of communication data (encoded movie data 5) is input from the communication unit 33, the decoder 35 determines to be Yes in Step S31 and decodes the input movie data 5 (Step S32). Please note that, when movie data 5 of macro blocks corresponding to the horizontal width of a frame is input, the decoder 35 determines to be Yes in Step S31 and performs decoding for each macro block.

As described before, a macro block includes 16 pixels in the vertical direction. Thus, the predetermined amount of communication data in Step S31 is movie data 5 of 16 lines. In other words, every time the movie data 5 of 16 lines is input from the communication unit 33, the decoder 35 performs Step S32 to sequentially start decoding for a plurality of macro blocks included in the input 16 lines of movie data 5. The decoded movie data 5 is stored in a memory (not shown) in the decoder 35.

In parallel to the processes in Steps S31 and S32, the decoder 35 monitors the data amount of frame data 50 for which decoding is completed by Step S33, as described before.

When decoding of a predetermined amount of frame data 50 is completed (a predetermined amount of frame data 50 is stored in the memory in the decoder 35), the decoder 35 determines to be "Yes" every time Step S33 is executed and checks ON state of the second vertical synchronizing signal (Step S34). In other words, the decoder 35 is placed in a state for waiting for the ON state of the second vertical synchronizing signal.

In this state, when the second vertical synchronizing signal is turned ON, the decoder 35 outputs the frame data 50 (movie data 5) in the memory to the TV receiver 4 via the connection terminal 36. Thus, the TV receiver 4 reproduces the movie data 5 by presenting it on the screen from the extension unit 3 (decoder 35).

Because the second vertical synchronizing signal is a signal which is turned ON at the frame interval, Step S34 is determined to be Yes at the frame interval. The data required for presentation at the frame interval is data corresponding to one frame. Therefore, the predetermined amount of frame data 50 in Step S33 is frame data 50 of one frame (i.e., one unit of frame data 50).

That is, the movie reproduction system 1 outputs the frame data 50 from the extension unit 3 to the TV receiver 4 in accordance with the second vertical synchronizing signal at the frame interval and presents it on the TV receiver 4.

In this manner, the movie reproduction system 1 presents frame data 50 of each frame included in the movie data 5 in accordance with the second vertical synchronizing signal, thereby reproducing the movie represented by that movie data 5.

In the above, the movie reproduction method is described. Although omitted in the above description for the sake of simplification, the synchronizing process is a process which is performed at an appropriate time or repeated continuously. For example, the processes for synchronizing the clock 26 and the clock 34 with each other (Steps S1 and S21) are not performed only at the start-up of the system, but are performed any time.

Next, it is described how the problems of the conventional techniques can be solved by this embodiment.

Figure 8:
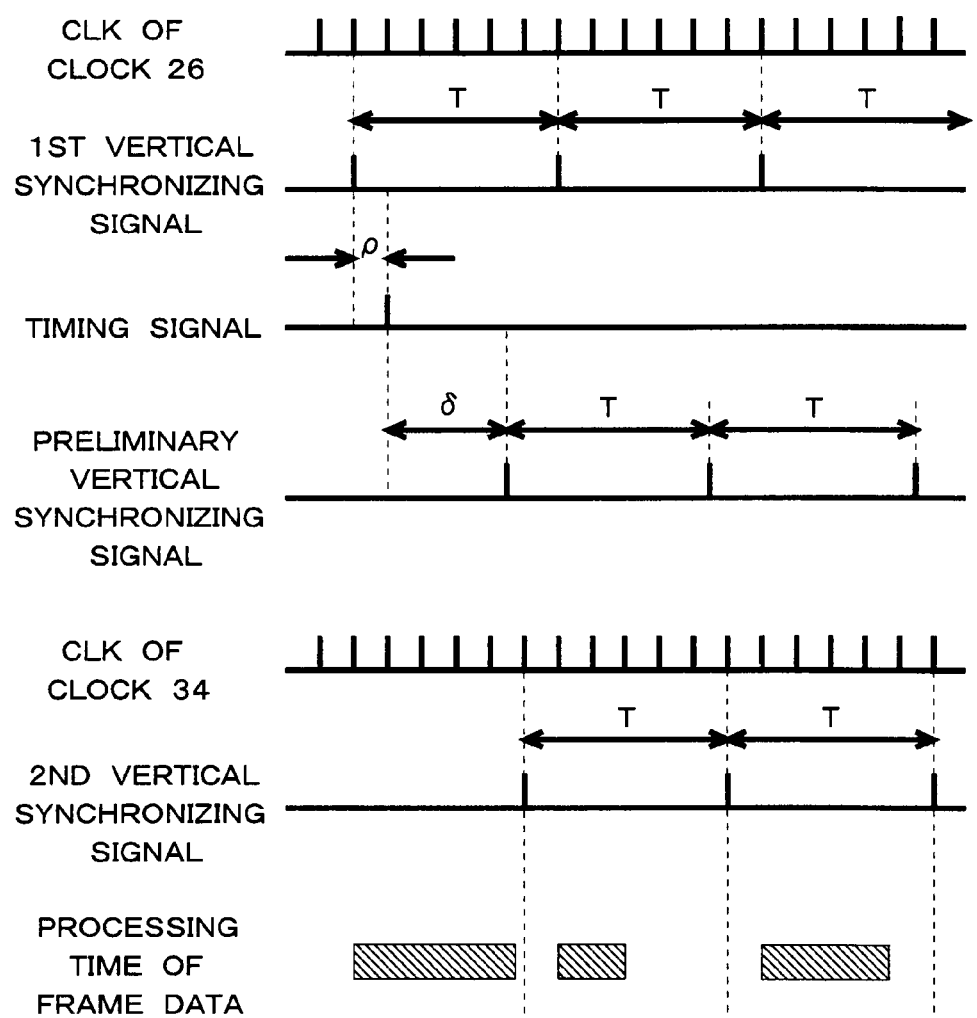
FIG. 8 is a diagram showing timings of various signals in the first embodiment.

FIG. 8 is a diagram showing timings of various signals in the first embodiment. "T" shown in FIG. 8 is a frame interval. "ρ" is a delay time of start time data as communication data and "δ" is an expected value indicated by setting data 310.

In the movie reproduction system 1 in the first embodiment, only data indicating a time for starting generation of frame data 51 is sent as communication data. Therefore, the timing signal is a signal which is turned ON only once.

In addition, the start time data is sent as the communication data different from movie data 5 and is given higher priority. That is, the communication data of the start time data has a small data amount and is sent prior to other communication data (waiting time for transmission is short). Therefore, the delay time ρ is sufficiently small as compared with the time period required for processing frame data 50 (i.e., the expected value δ) and can be ignored when the expected value δ is theoretically obtained.

As shown in FIG. 8, the clock 26 in the game main body 2 and the first vertical synchronizing signal are made synchronized with each other by the encoder 25. Also, the clock 26 in the game main body 2 and the clock 34 in the extension unit 3 are made synchronized with each other by a procedure of wireless communication. Therefore, the clock 34 in the extension unit 3 and the first vertical synchronizing signal are synchronized with each other.

Assuming that a time for starting generation of movie data 5 is a time at which the first vertical synchronizing signal is turned ON for the first time, as show in FIG. 8, the delay time ρ occurs after the communication unit 23 generates and sends start time data by that time until the communication unit 33 receives it as the communication data. Thus, the timing signal which is input to the decoder 35 is turned ON, when the delay time ρ has passed after the start time of generation of the movie data 5.

The decoder 35 generates a delay signal in accordance with this timing signal and the expected value δ indicated by the setting data 310, and generates a preliminary vertical synchronizing signal which has a period equal to the frame interval T in synchronization with this delay signal. That is, as shown in FIG. 8, the preliminary vertical synchronizing signal is started later than the start time of generation of the movie data 5 by time "ρ+δ" and has a period T. However, since the timing signal is tuned ON only once, the preliminary vertical synchronizing signal is not synchronized with the first vertical synchronizing signal (is shifted as time has passed, in general).

Therefore, the decoder 35 synchronizes the clock 34 which has been already made synchronized with the first vertical synchronizing signal, with the preliminary vertical synchronizing signal, thereby generating the second vertical synchronizing signal synchronized with the first vertical synchronizing signal.

On the other hand, each frame data 50 of the movie data 5 is generated at a time at which the first vertical synchronizing signal is turned ON. Therefore, the process for each frame data 50 is started at the time at which the first vertical synchronizing signal is turned ON.

However, the processing time for each frame data 50 is not constant, as shown with a hatched rectangle in FIG. 8. Thus, the time at which a series of processes is completed for each frame data 50 is varied.

The process for each frame data 50, however, is completed within a time of the expected value δ after generation of that frame data 50 is started (the expected value δ is determined to do so). Therefore, the second vertical synchronizing signal can be prevented from being turned ON before completion of the process for each frame data 50. That is, the delay time for each frame is about the same as the expected value δ, and the increase in the delay time caused by waiting for presentation time can be suppressed.

As described above, the movie reproduction system 1 in the first embodiment for, while the clock 26 provided in the communication unit 23 and the clock 34 provided in the communication unit 33 are synchronized with each other, sending/receiving movie data 5 representing a movie between the communication unit 23 and the communication unit 33 and reproducing that movie data, includes the image processor unit 24 which generates the first vertical synchronizing signal in accordance with the clock 26 of the communication unit 23 and which generates movie data representing a movie by generating frame data in accordance with the generated first vertical synchronizing signal. The communication unit 23 sends, as communication data, start time data indicating a time for starting generation of the movie data 5 by the image processor unit 24 and the movie data 5 generated by the image processor unit 24. The movie reproduction system 1 further includes: the decoder 35 which generates the second vertical synchronizing signal in accordance with the start time data received as the communication data by the communication unit 33 and the clock 34 of the communication unit 33; and the TV receiver 4 which presents frame data 50 included in the movie data 5 received as the communication data by the communication unit 33 in accordance with the second vertical synchronizing signal generated by the decoder 35, thereby reproducing the movie represented by the movie data 5. Thus, the first vertical synchronizing signal and the second vertical synchronizing signal are synchronized with each other and therefore a delay time of the movie data is shortened.

Moreover, the communication unit 23 sends the communication data of the start time data and the communication data of the movie data 5 separately from each other. Thus, a delay time of the start time data can be shortened as compared with a case where the start time data is sent together with the movie data 5 of which the delay time is relatively large. Therefore, accuracy of the second vertical synchronizing signal which should satisfy a predetermined condition is more improved.

In addition, the communication unit 23 sends the communication data of the start time data with higher priority than the priority of the communication data of the movie data 5. Thus, the delay time of the start time data can be further reduced. Therefore, the second vertical synchronizing signal which should satisfy the predetermined condition is further improved.

In the first embodiment, the second vertical synchronizing signal is generated such that the period thereof is equal to the frame interval. Thus, in this embodiment, the movie data 5 is output to the TV receiver 4 on a basis of data corresponding to one frame (frame data 50). The size of an image output to the TV receiver 4, however, is not always limited to the frame size. For example, the period of the second vertical synchronizing signal may be determined such that the movie data 5 is output to the TV receiver 4 on a basis of line data (not limited to one line). Of course, the period in this case is shorter than the frame interval. This is the same in the embodiments described later.

Furthermore, in the first embodiment, it is described that the first vertical synchronizing signal is generated by dividing the frequency of the clock signal of the clock 26 and the clock signal of the clock 26 and the first vertical synchronizing signal are synchronized with each other. Similarly, it is described that the second vertical synchronizing signal is generated by dividing the frequency of the clock signal of the clock 34 and the clock signal of the clock 34 and the second vertical synchronizing signal are synchronized with each other. However, the technique for synchronizing the clock signal of the clock 26 and the first vertical synchronizing signal with each other and the technique for synchronizing the clock signal of the clock 34 and the second vertical synchronizing signal with each other are not limited to "dividing the frequency". In other words, a known technique for synchronizing two different signals with each other may be adapted in an appropriate manner.

2. Second Embodiment

In the first embodiment, an example is described in which two communication clocks (clocks 26 and 34) which are provided on a movie data generation side and a movie data reproduction side, respectively, and are synchronized with each other are used for synchronizing a vertical synchronizing signal for movie data generation (first vertical synchronizing signal) and a vertical synchronizing signal for movie data reproduction (second vertical synchronizing signal) with each other. However, the technique for synchronizing the first vertical synchronizing signal and the second vertical synchronizing signal with each other is not limited to the example described in the first embodiment.

Figure 9:
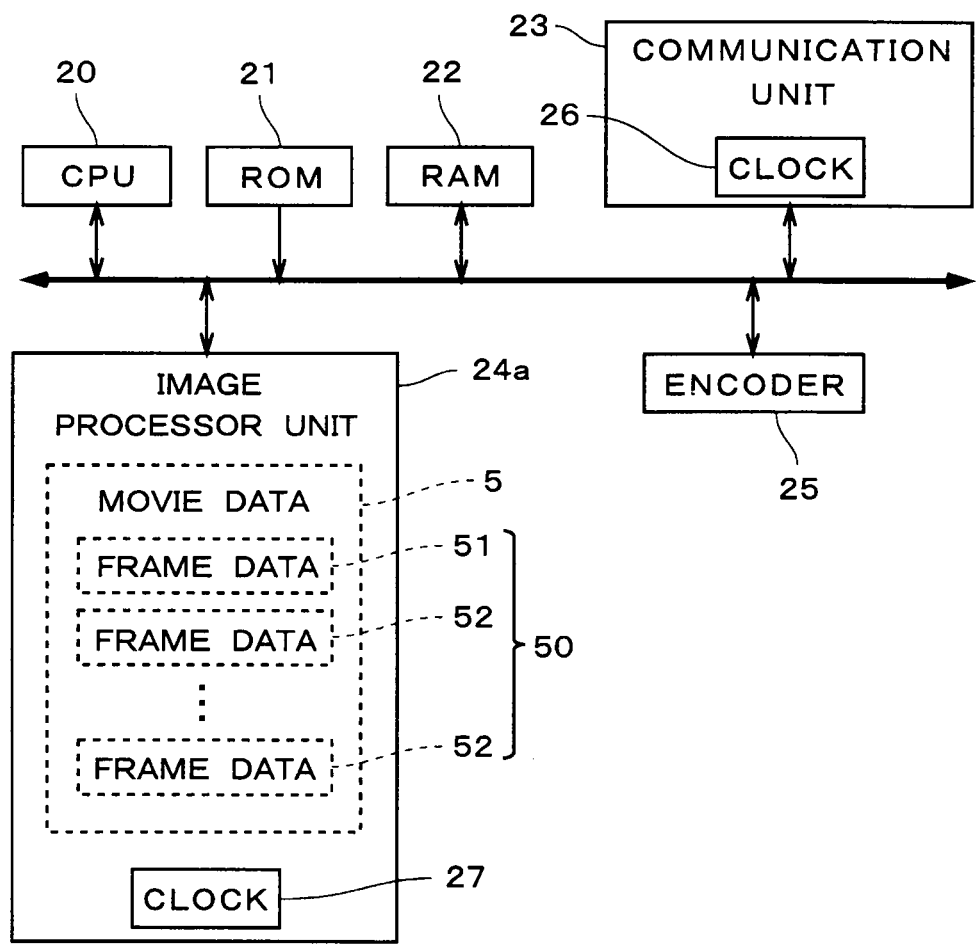
FIG. 9 is a block diagram showing the structure of the game main body in the second embodiment.

FIG. 9 is a block diagram showing the structure of the game main body 2 in the second embodiment. The game main body 2 in the second embodiment is different from that in the first embodiment in that an image processor unit 24a is provided instead of the image processor unit 24. In the following description, the same structure of the movie reproduction system 1 in the second embodiment as that of the first embodiment is labeled with the same reference sign, and the description thereof is omitted in an appropriate manner.

The image processor unit 24a in the second embodiment is different from the image processor unit 24 in the first embodiment in that it includes a clock 27, as shown in FIG. 9.

The clock 27 is arranged as a circuit including an oscillator (not shown) for generating a signal having a predetermined frequency, and has a function of generating the first vertical synchronizing signal having the frequency equal to the frame interval. The clock 27 may be arranged such that the frequency of a signal to be generated can be varied, as in the clocks 26 and 34.

The image processor unit 24a generates frame data 50 in accordance with the first vertical synchronizing signal generated by the clock 27, thereby generating movie data 5 representing a movie. Therefore, also in the second embodiment, generation of the frame data 50 is started every time the first vertical synchronizing signal is turned ON, as in the first embodiment.

The image processor unit 24a also outputs the first vertical synchronizing signal generated by the clock 27 to the communication unit 23. Thus, to the communication unit 23, the first vertical synchronizing signal indicating a time for starting generation of each frame data 50 forming movie data 5 is input.

The communication unit 23 in the second embodiment generates frame timing data in accordance with a time at which the first vertical synchronizing signal input thereto is turned ON, and sends it as communication data to the extension unit 3. This frame timing data is sent separately from communication data of the movie data 5, with higher priority than the communication data of the movie data 5.

Figure 10:
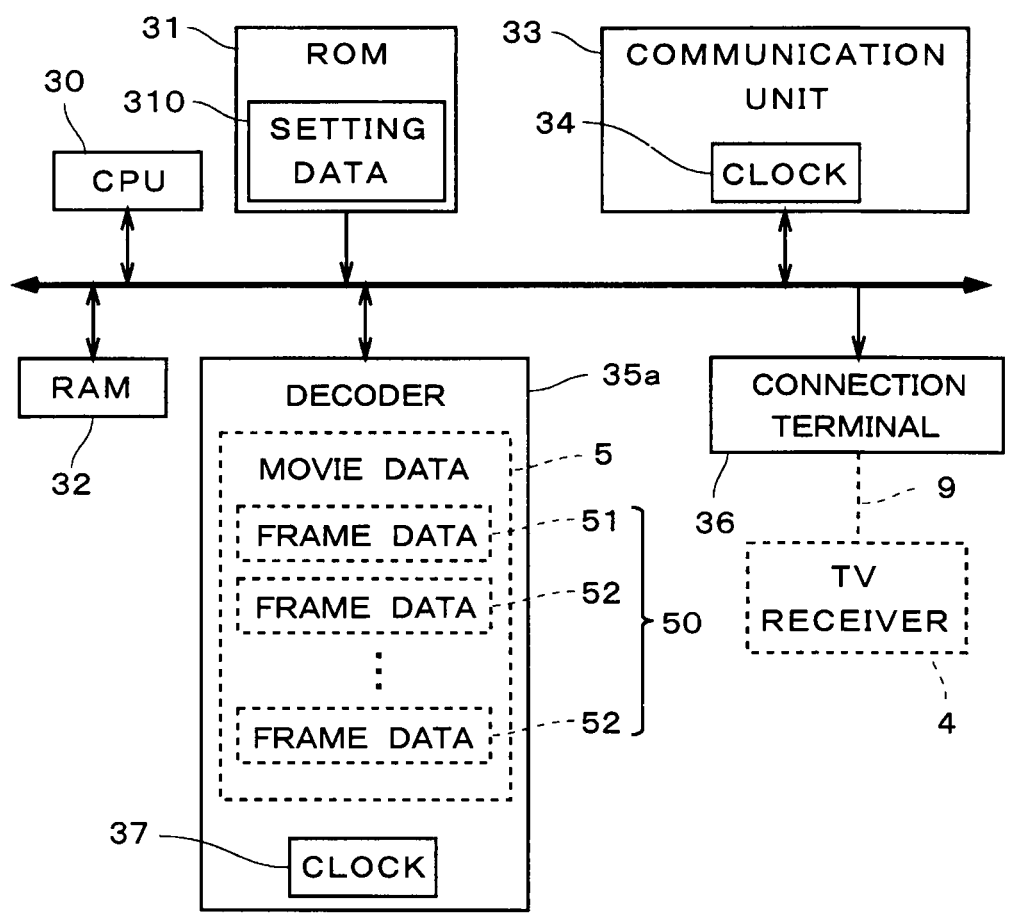
FIG. 10 is a block diagram showing the structure of the extension unit in the second embodiment.

FIG. 10 is a block diagram showing the structure of the extension unit 3 in the second embodiment. The extension unit 3 in the second embodiment is different from the extension unit 3 in the first embodiment in that it includes a decoder 35a instead of the decoder 35. Moreover, in the setting data 310, threshold values (described later) are stored in addition to the expected value.

In the second embodiment, a timing signal, which is turned ON every time the communication unit 33 receives the communication data of the frame timing data, is input from the CPU 30 to the decoder 35a. The frame timing data is sent from the game main body 2 every time generation of frame data 50 is started. Therefore, the timing signal in the second embodiment is different from the timing signal in the first embodiment in that it is turned ON more than once.

Figure 11:
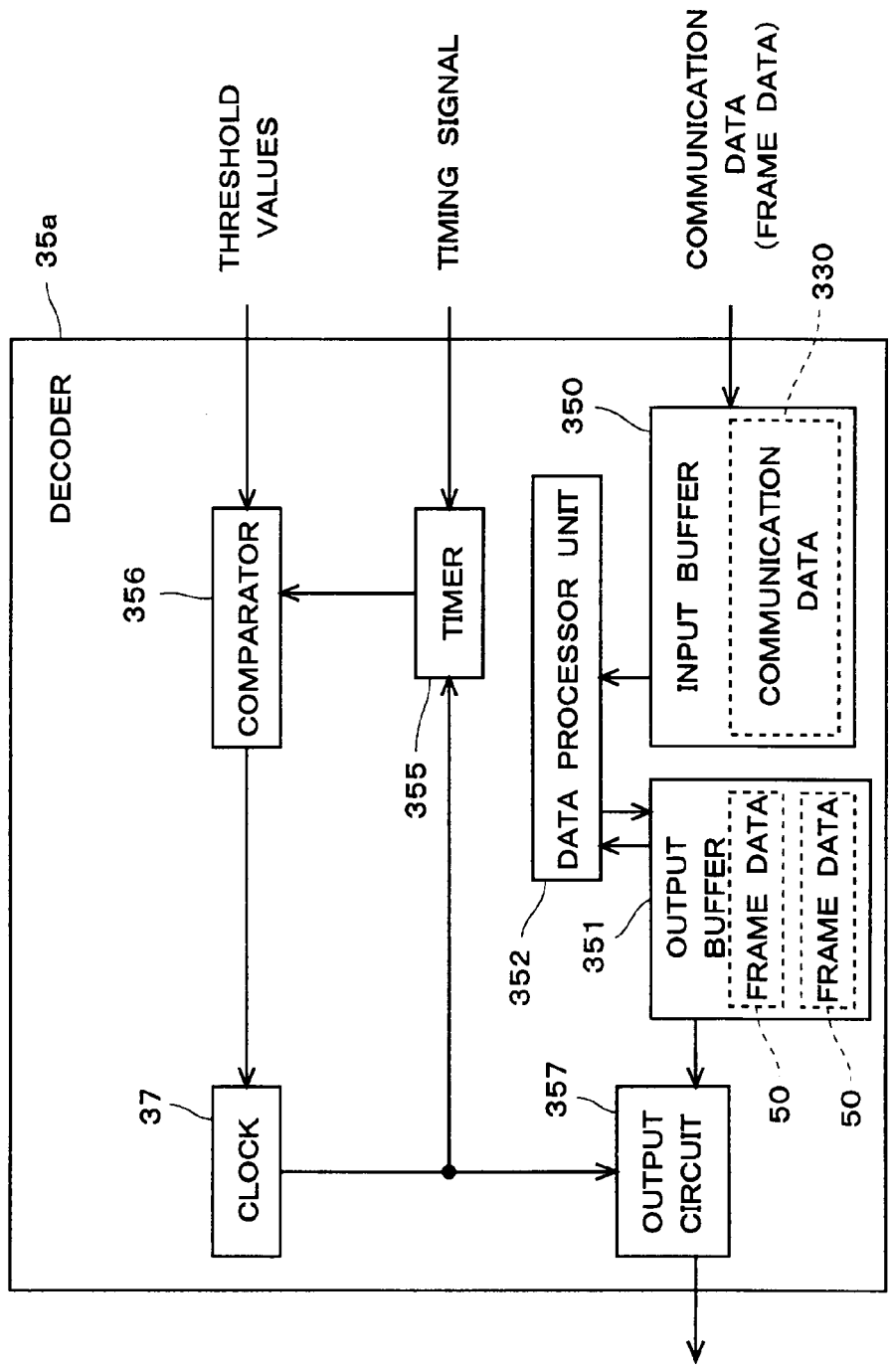
FIG. 11 is a diagram showing the structure of the decoder in the second embodiment.

FIG. 11 is a diagram showing the structure of the decoder 35a in the second embodiment. As shown in FIG. 11, to the decoder 35a, the timing signal from the CPU 30, the setting data 310 (threshold values) read out from the ROM 31, and the communication data received by the communication unit 33 (a part of the communication data which is related to the frame data 50) are input.

The decoder 35a in the second embodiment includes a clock 37, an input buffer 350, an output buffer 351, a data processor unit 352, a timer 355, a comparator 356, and an output circuit 357. Please note the shown hardware structure is merely an example, but the structure of the decoder 35a is not limited thereto.

To the input buffer 350, a part (communication data 330) of the communication data received by the communication unit 33, which is related to the movie data 5 (frame data 50), is input from the communication unit 33. The input part of the communication data is stored in the input buffer 350. The output buffer 351 has a storage capacity such that it can store decoded frame data 50 of at least two frames.

When a predetermined amount of communication data 330 (encoded frame data 50) is stored in the input buffer 350, the data processor unit 352 reads out and decodes it, and then stores the decoded data into the output buffer 351. As for the frame data 50 encoded by the difference from previous frame data 50, the previous frame data 50 is read out from the output buffer 351 and decoding is performed.

The clock 37 has the same structure as the clocks 26 and 34, for example, and the frequency of a signal output therefrom can be varied. The oscillator of the clock 37 starts self-oscillation in accordance with a time at which the extension unit 3 is activated, for example. Thus, the clock 37 outputs a signal having the frequency equal to the frame interval.

The signal output from the clock 37 is output to the output circuit 357. That is, the output signal of the clock 37 is the second vertical synchronizing signal in the second embodiment. The second vertical synchronizing signal output from the clock 37 is also output to the timer 355.

The timer 355 starts at a time at which the second vertical synchronizing signal input from the clock 37 is turned ON, and outputs a value (corresponding to elapsed time) to the comparator 356 at a time at which the timing signal is turned ON. That is, the timer 355 has a function of measuring a delay (time difference) of the timing signal with respect to the second vertical synchronizing signal and outputting it to the comparator 356.

The comparator 356 compares the "delay" input from the timer 355 and the threshold values input to the decoder 35a (setting data 310) with each other. An output signal of the comparator 356 is a signal transmitting whether or not the "delay" is in a range between an upper limit and a lower limit indicated by the threshold values, to the clock 37.

In other words, the timing signal in the second embodiment is a signal which always notifies the first vertical synchronizing signal. Therefore, the comparator 356 has a function of determining whether or not the delay of the second vertical synchronizing signal, which is to be a signal delayed from the timing signal (the first vertical synchronizing signal) by the expected value, is in an acceptable range. It should be noted that the "delay" measured by the timer 355 in the second embodiment is the delay of the timing signal with respect to the second vertical signal and therefore the threshold values in the second embodiment are an upper limit and a lower limit set in accordance with the acceptable range for "the frame interval-the expected value".

The comparator 356 outputs an upper limit determination signal which is turned ON in a case where the "delay" is larger than the upper limit of the threshold values (the delay is smaller than the expected value) and a lower limit determination signal which is turned ON in a case where the "delay" is smaller than the lower limit of the threshold values (the delay is larger than the expected value) as its output signals to the clock 37.

In other words, when the "delay" is in an acceptable range, both the output signals of the comparator 356 are in OFF state. When both the upper limit determination signal and the lower limit determination signal input from the comparator 356 are in OFF state, the control circuit of the clock 37 keeps the frequency of the oscillator without changing it. Thus, the second vertical synchronizing signal is maintained.

On the other hand, when the "delay" is out of the threshold range, either one of the upper limit determination signal and the lower limit determination signal output from the comparator 356 is placed in ON state.

When the upper limit determination signal input from the comparator 356 is in ON state, the control circuit of the clock 37 lowers the control voltage, thereby controlling the oscillator to lower the frequency. Thus, the frequency of the second vertical synchronizing signal is lowered and therefore the delay of the second vertical synchronizing signal with respect to the timing signal can be made larger. Consequently, the "delay" of the timing signal with respect to the second vertical synchronizing signal becomes smaller. This control continues to be performed until the "delay" reaches a level equal to or lower than the upper limit of the threshold values.

When the lower limit determination signal input from the comparator 356 is in ON state, the control circuit of the clock 37 makes the control voltage higher, thereby controlling the oscillator to make the frequency higher. Thus, the frequency of the second vertical synchronizing signal is made higher and therefore the delay of the second vertical synchronizing signal with respect to the timing signal can be reduced. Consequently, the "delay" of the timing signal with respect to the second vertical synchronizing signal becomes larger. This control continues to be performed until the "delay" reaches a level equal to or larger than the lower limit of the threshold values.

As described above, in the second embodiment, the second vertical synchronizing signal having an increased shift from the first vertical synchronizing signal (timing signal) is corrected by the clock 37 to reduce the shift in accordance with the output signals from the comparator 356.

The output circuit 357 is a circuit for controlling a time at which the frame data 50 stored in the output buffer 351 is output to the TV receiver 4 via the connection terminal 36. More specifically, at a time at which a predetermined amount of frame data 50 is prepared in the output buffer 351 and the second vertical synchronizing signal input from the clock 37 is turned ON, the output circuit 357 outputs that frame data 50.

A movie reproduction method implemented by the above-described movie reproduction system 1 in the second embodiment is described.

Figure 12:
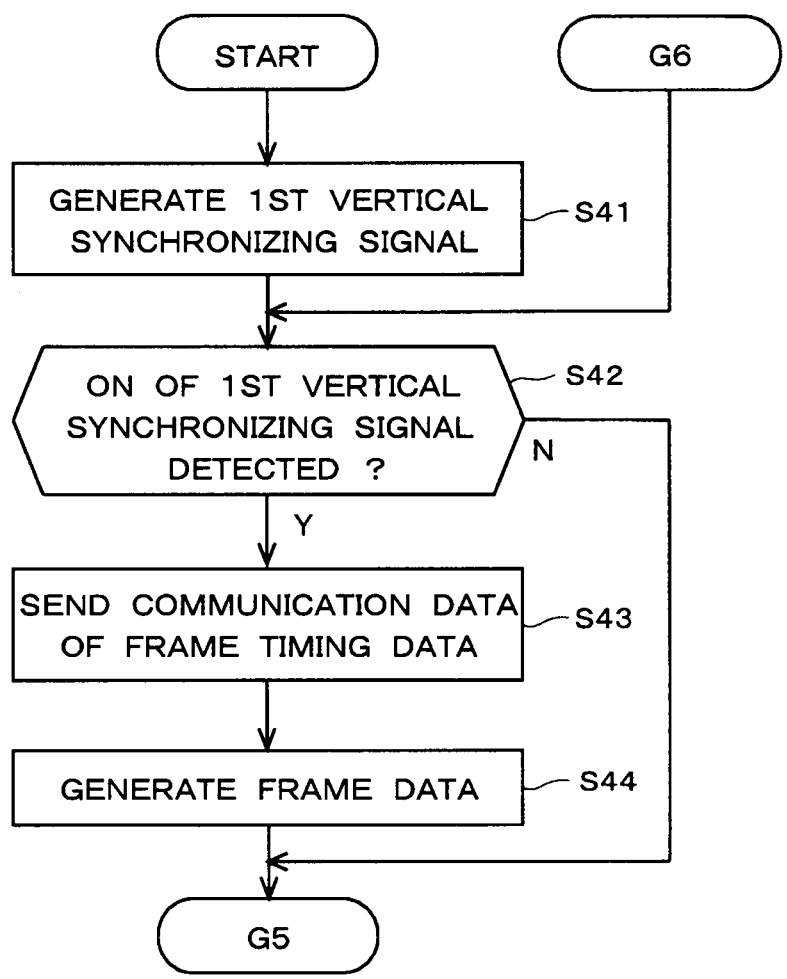
FIG. 12 is a flowchart showing an operation of the game main body in the second embodiment.
Figure 13:
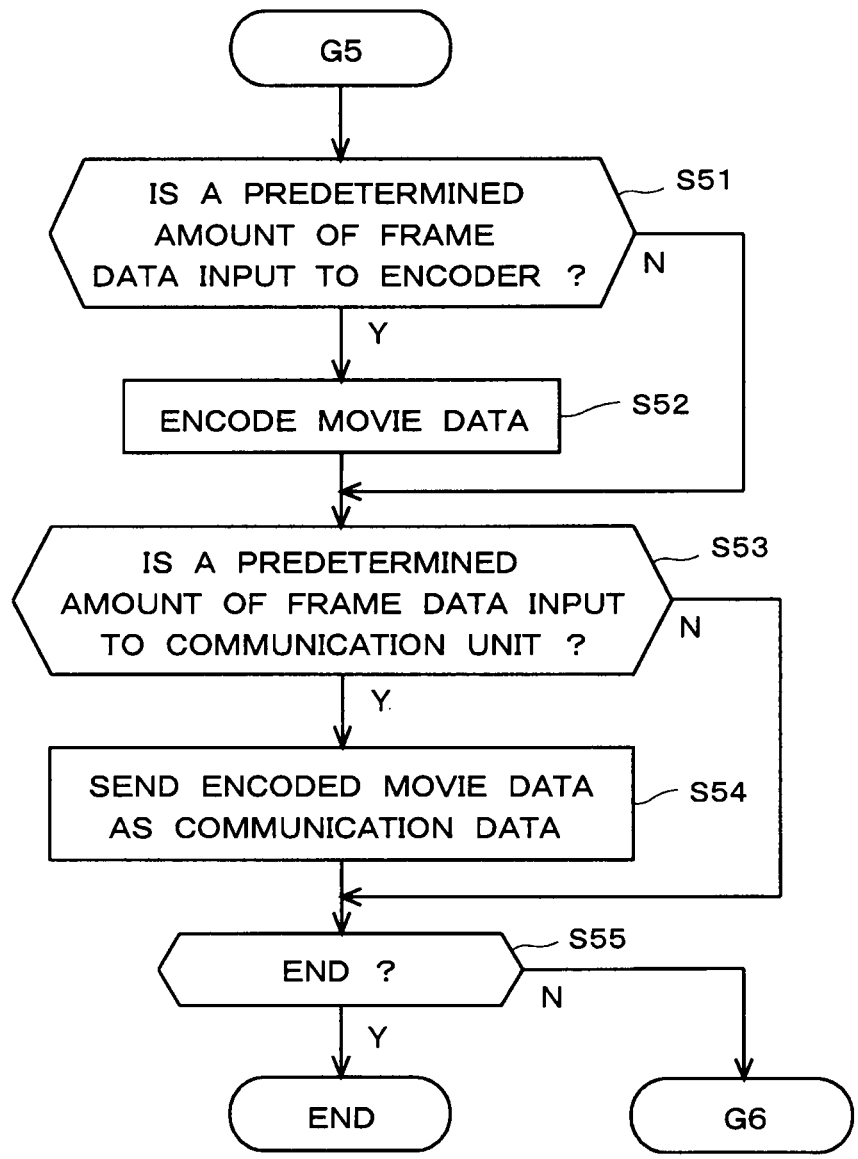
FIG. 13 is a flowchart showing an operation of the game main body in the second embodiment.

FIGS. 12 and 13 are flowcharts showing an operation of the game main body 2 in the second embodiment.

The image processor unit 24a of the game main body 2 in the second embodiment generates the first vertical synchronizing signal by the clock 27 (Step S41). Prior to Step S41, the process corresponding to Step S1 in the first embodiment is executed, such that the clock 26 and the clock 34 are made synchronized with each other. That is, a normally performed procedure in wireless communication is performed, although not shown in FIG. 12.

When the first vertical synchronizing signal is generated, the image processor unit 24a and the communication unit 23 are placed in a state for monitoring ON state of the first vertical synchronizing signal output from the clock 27 (Step S42). The encoder 25 is placed in a state for monitoring whether or not a predetermined amount of frame data 50 is input from the image processing unit 24a (Step S51). Moreover, the communication unit 23 is placed in a state for monitoring whether or not a predetermined amount of frame data 50 is input from the encoder 25 (Step S53).

When the first vertical synchronizing signal is turned ON, the communication unit 23 generates frame timing data as communication data at a time of detection of the ON state of the first vertical synchronizing signal, and sends the communication data of that frame timing data to the extension unit 3 (Step S43). In Step S43, the communication unit 23 gives higher priority to the frame timing data than to the movie data 5 and sends the communication data of the frame timing data separately from communication data of the movie data 5.

Then, the image processor unit 24a generates frame data 50 (Step S44). That is, generation of the frame data 50 is started by Step S44 and output of the generated frame data 50 to the encoder 25 is started.

The processes from Steps S51 to S55 in the second embodiment can be performed in the same manner as those from Steps S11 to S15 in the first embodiment, and therefore the description thereof is omitted.

In the first embodiment, the system 1 is arranged such that the clock 34 of the extension unit 3 and the first vertical synchronizing signal of the game main body 2 are made synchronized with each other via the clock 26 of the communication unit 23. In the second embodiment, however, the time at which the first vertical synchronizing signal is turned ON is notified by sending the frame timing data as the communication data to the extension unit 3 every time the first vertical synchronizing signal is turned ON, thereby the first vertical synchronizing signal and the second vertical synchronizing signal are made synchronized with each other.

Figure 14:
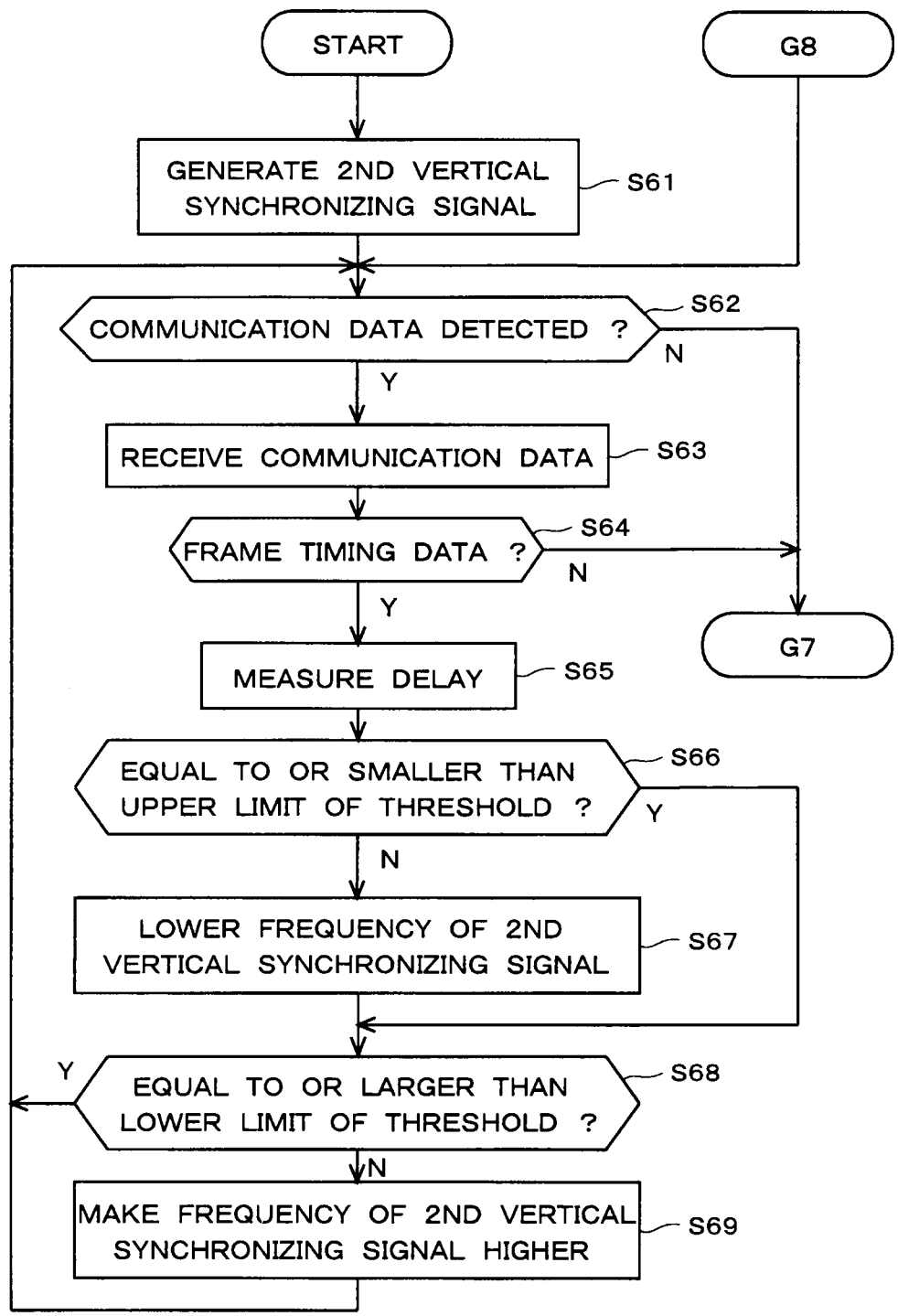
FIG. 14 is a flowchart showing operations of the extension unit and the TV receiver in the second embodiment.
Figure 15:
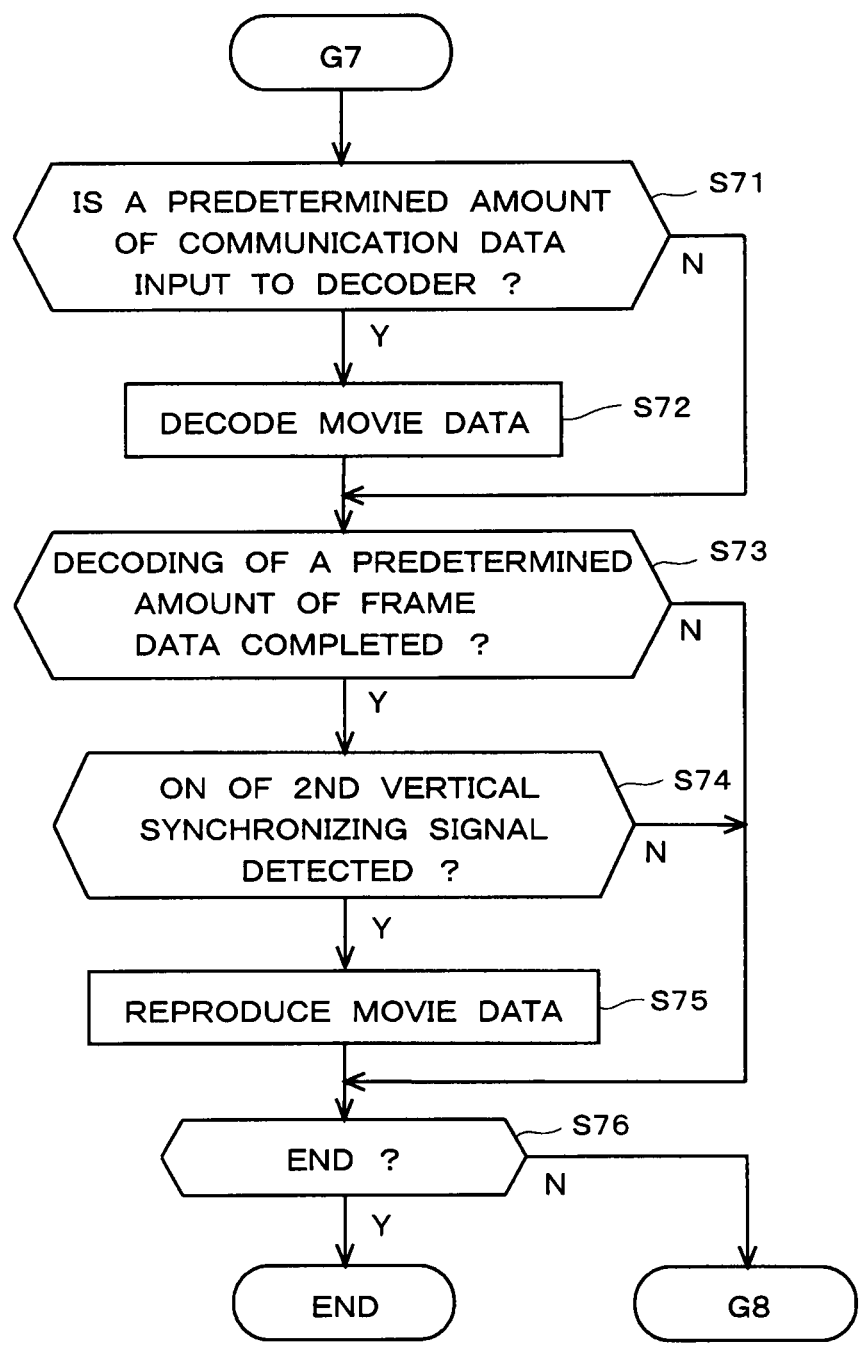
FIG. 15 is a flowchart showing operations of the extension unit and the TV receiver in the second embodiment.

FIGS. 14 and 15 are flowcharts showing operations of the extension unit 3 and the TV receiver 4 in the second embodiment.

First, when a power of the extension unit 3 is turned on, the oscillator of the clock 37 starts self-oscillation, thereby the clock 37 starts generation of the second vertical synchronizing signal (Step S61), and the communication unit 33 of the extension unit 3 is placed in a state for monitoring whether or not arrival of the communication data is detected (Step S62). Please note that, prior to Step S62, the process corresponding to Step S21 in the first embodiment is performed to synchronize the clock 26 and the clock 34 with each other.

When arrival of the communication data is detected, the communication unit 33 determines to be Yes in Step S62 and receives that communication data (Step S63). More specifically, receiving of the communication data is started by Step S63.

When no communication data is detected (No in Step S62), Steps S71 to S76 are executed. Those processes can be performed in the same manner as Steps S31 to S36 described in the first embodiment and therefore the description thereof is omitted.

Next, it is determined by the CPU 30 whether or not the communication data received in Step S63 is the frame timing data (Step S64). Also in a case where the communication data is not the frame timing data, the above steps S71 to S76 are performed.

In a case where the communication data received in Step S63 is the frame timing data (Yes in Step S64), the timing signal is turned ON at that time and the time at which the frame timing data is received is sent to the decoder 35a.

When it is determined to be Yes in Step S64 and the timing signal is turned ON, the timer 355 outputs a value (i.e., a value indicating the "delay") to the comparator 356. That is, the "delay" of the timing signal with respect to the second vertical synchronizing signal is measured by the timer 355 (Step S65).

Subsequently, the comparator 356 compares the threshold values indicated by the setting data 310 and the "delay" thus measured to each other.

When the "delay" is not equal to or less than the upper limit of the threshold values (No in Step S66), the upper limit determination signal output from the comparator 356 is placed in ON state. Thus, the control circuit of the clock 37 lowers the control voltage, thereby controlling the oscillator to lower the frequency (Step S67). This lowers the frequency of the second vertical synchronizing signal and therefore the delay of the second vertical synchronizing signal with respect to the timing signal becomes larger. Consequently, the "delay" of the timing signal with respect to the second vertical synchronizing signal becomes smaller.

In a case where the "delay" is not equal to or larger than the lower limit of the threshold values (No in Step S68), the lower limit determination signal output from the comparator 356 is in ON state. Thus, the control circuit of the clock 37 makes the control voltage higher, thereby controlling the oscillator to make the frequency higher (Step S69). This makes the frequency of the second vertical synchronizing signal higher, and therefore the delay of the second vertical synchronizing signal with respect to the timing signal becomes smaller. Consequently, the "delay" of the timing signal with respect to the second vertical synchronizing signal becomes larger.

On the other hand, in a case where the "delay" is in a range of the threshold values, only OFF signals are output from the comparator 356 and therefore change of the control voltage (change of the oscillator's frequency) by the control circuit of the clock 37 is not performed. Therefore, the second vertical synchronizing signal is maintained.

As described above, the movie reproduction system 1 in the second embodiment is arranged as a system for sending/receiving movie data 5 representing a movie between the communication unit 23 for sending communication data and the communication unit 33 for receiving the communication data, and for reproducing that movie, and includes the image processor unit 24a for generating the first vertical synchronizing signal and generating frame data in accordance with the generated first vertical synchronizing signal to generate movie data 5 representing a movie. The communication unit 23 sends frame timing data indicating a time for starting generation of frame data 50 for each frame by the image processor unit 24a and the movie data 5 as communication data. The system 1 further includes: the clock 37 for generating the second vertical synchronizing signal in accordance with the frame timing data received as the communication data by the communication unit 33; and the TV receiver 4 for reproducing the movie represented by the movie data 5 by presenting the frame data 50 included in the movie data 5 which the communication unit 33 receives as the communication data in accordance with the second vertical synchronizing signal generated by the clock 37. Thus, the movie reproduction system 1 in the second embodiment can obtain the same effects as those obtained in the first embodiment.

Moreover, the communication unit 23 gives higher priority to the communication data of the frame timing data than to the communication data of the movie data 5. Thus, the delay time of the frame timing data can be shortened. Therefore, accuracy of the second vertical synchronizing signal which should satisfy a predetermined condition can be further improved.

3. Third Embodiment

In the second embodiment, the system is arranged such that the frame timing data and the movie data (frame data) are sent as separate communication data from each other. However, the system can be arranged such that the movie data received as the communication data on the receiving side is also used as the frame timing data and the second vertical synchronizing signal is generated in accordance with a time at which the movie data is received.

The third embodiment can be implemented by the same structure of the movie reproduction system 1 in the second embodiment. Therefore, the same reference signs as those in the movie reproduction system 1 in the second embodiment are used and the description of the third embodiment is omitted in an appropriate manner.

The image processor unit 24a of the movie reproduction system 1 in the third embodiment does not output the first vertical synchronizing signal to the communication unit 23.

In general, a header for storing data other than data representing an image therein is added to the leading portion of the frame data 50, although the description is omitted in the above embodiments. The header can be various data depending on its use, e.g., data merely indicating the leading portion of the frame data 50 or data indicating information such as an encoding method and the image quality.

However, the header is generated in accordance with rules determined in advance between the sending side and the receiving side, and is generated such that it can be distinguished from data representing an image on the receiving side. That is, even if a special structure is not provided in the game main body 2 and the extension unit 3, it is possible to provide the header to the frame data 50 and identify the header in the received frame data 50.

When starting generation of the frame data 50, the image processor unit 24a in the third embodiment also generates header data by a conventional technique and outputs it to the encoder 25.

The encoder 25 in the third embodiment ignores the header data in the frame data 50, only encodes a part of the frame data 50 which represents an image, and outputs the encoded part together with the header data to the communication unit 23 as encoded frame data 50.

The communication unit 23 in the third embodiment sends the extension unit 3 the encoded frame data 50 input from the encoder 25. That is, in the third embodiment, the communication data of the frame timing data is not sent separately from the communication data of the movie data 5.

When analyzing the communication data received by the communication unit 33 and detecting the header data, the CPU 30 of the extension unit 3 turns the timing signal ON at that time. That is, in the movie reproduction system 1 in the third embodiment, the timing signal is turned ON in accordance with the time at which the header which forms the leading part of the frame data 50 is received.

In this manner, in the movie reproduction system 1 of the third embodiment, the header data included in the frame data 50 (the header data also forms a portion of the movie data 5) is regarded as the frame timing data (is used as the frame timing data), thereby ensuring synchronization between the first vertical synchronizing signal and the second vertical synchronizing signal.

Figure 16:
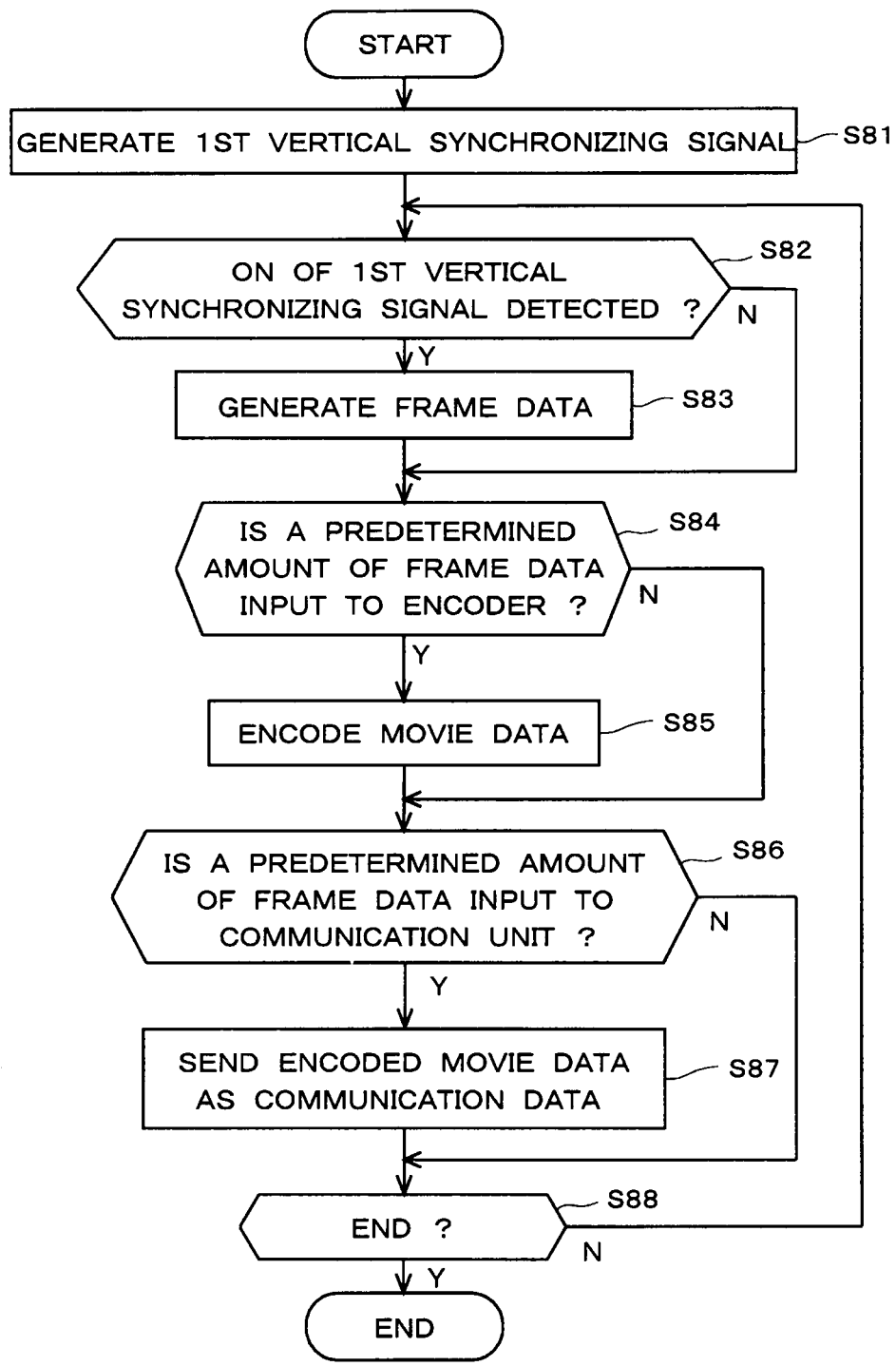
FIG. 16 is a flowchart showing an operation of the game main body in the third embodiment.

FIG. 16 is a flowchart showing an operation of the game main body 2 in the third embodiment.

First, the game main body 2 in the third embodiment generates the first vertical synchronizing signal by the image processing unit 24a in the same manner as that in Step S41 of the game main body 2 in the second embodiment (Step S81).

When the first vertical synchronizing signal is generated, the image processor unit 24a and the communication unit 23 are placed in a state for monitoring ON state of the first vertical synchronizing signal (Step S82). Moreover, the encoder 25 is placed in a state for monitoring whether or not a predetermined amount of frame data 50 is input from the image processor unit 24a (Step S84). The communication unit 23 is placed in a state for monitoring whether or not a predetermined amount of frame data 50 is input from the encoder 25 (Step S86).

When ON state of the first vertical synchronizing signal is detected (Yes in Step S82), the image processor unit 24a generates frame data 50 at that time. The image processor unit 24a also generates header data by using a conventional technique at that time, and outputs it to the encoder 25.

In the third embodiment, communication data of the frame timing data is not generated by the communication unit 23 separately from the communication data of the movie data 5. Instead, by generating the communication data of the movie data 5 (frame data 50), the communication data of the frame timing data is generated. Therefore, in the movie reproduction method in the third embodiment, the process corresponding to Step S43 in the second embodiment (FIG. 12) is not performed, as shown in FIG. 16.

The processes from Steps S84 to S88 can be performed in the same manner as Steps S51 to S55 in the second embodiment, and therefore the description thereof is omitted.

Figure 17:
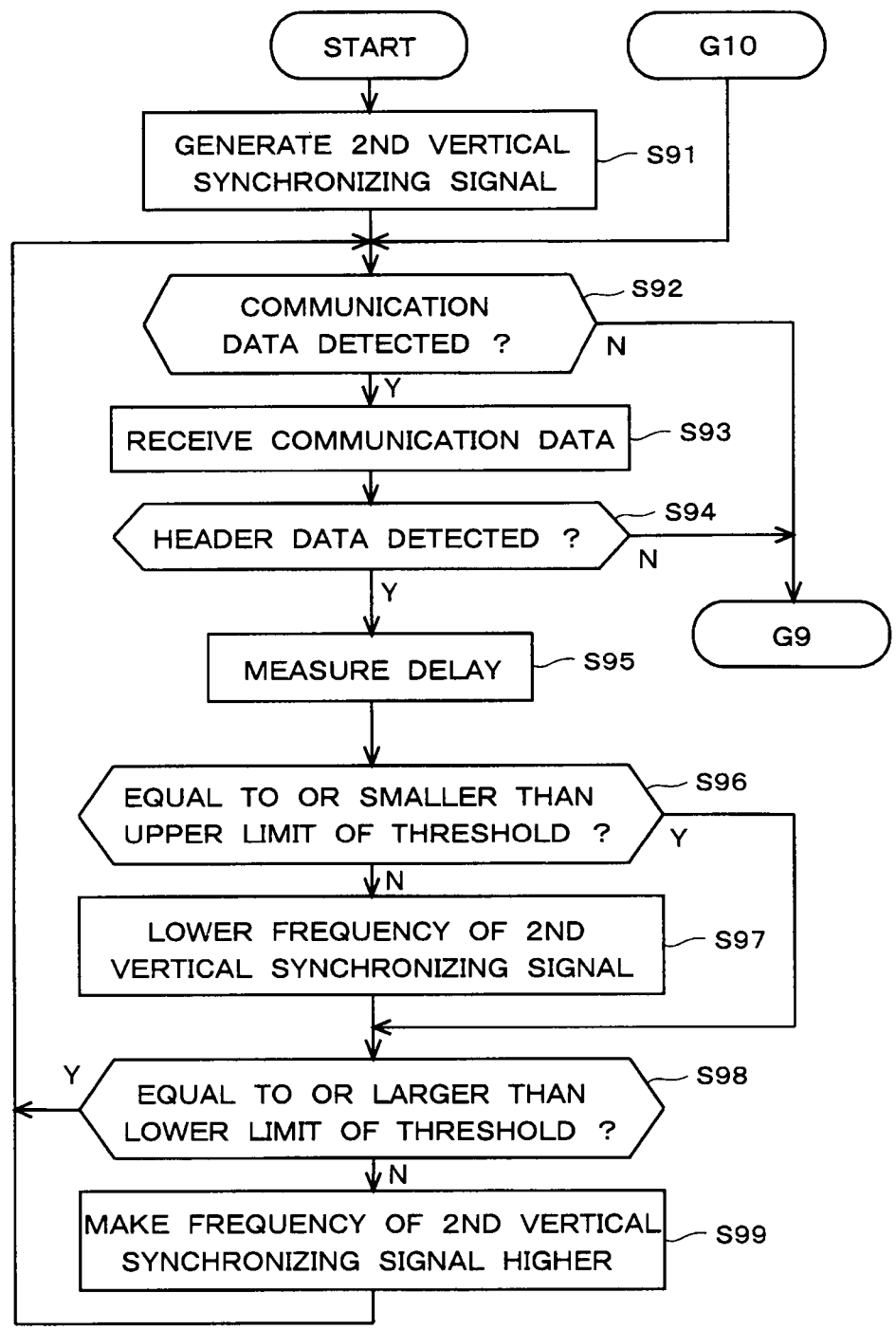
FIG. 17 is a flowchart showing operations of the extenuation unit and the TV receiver in the third embodiment.
Figure 18:
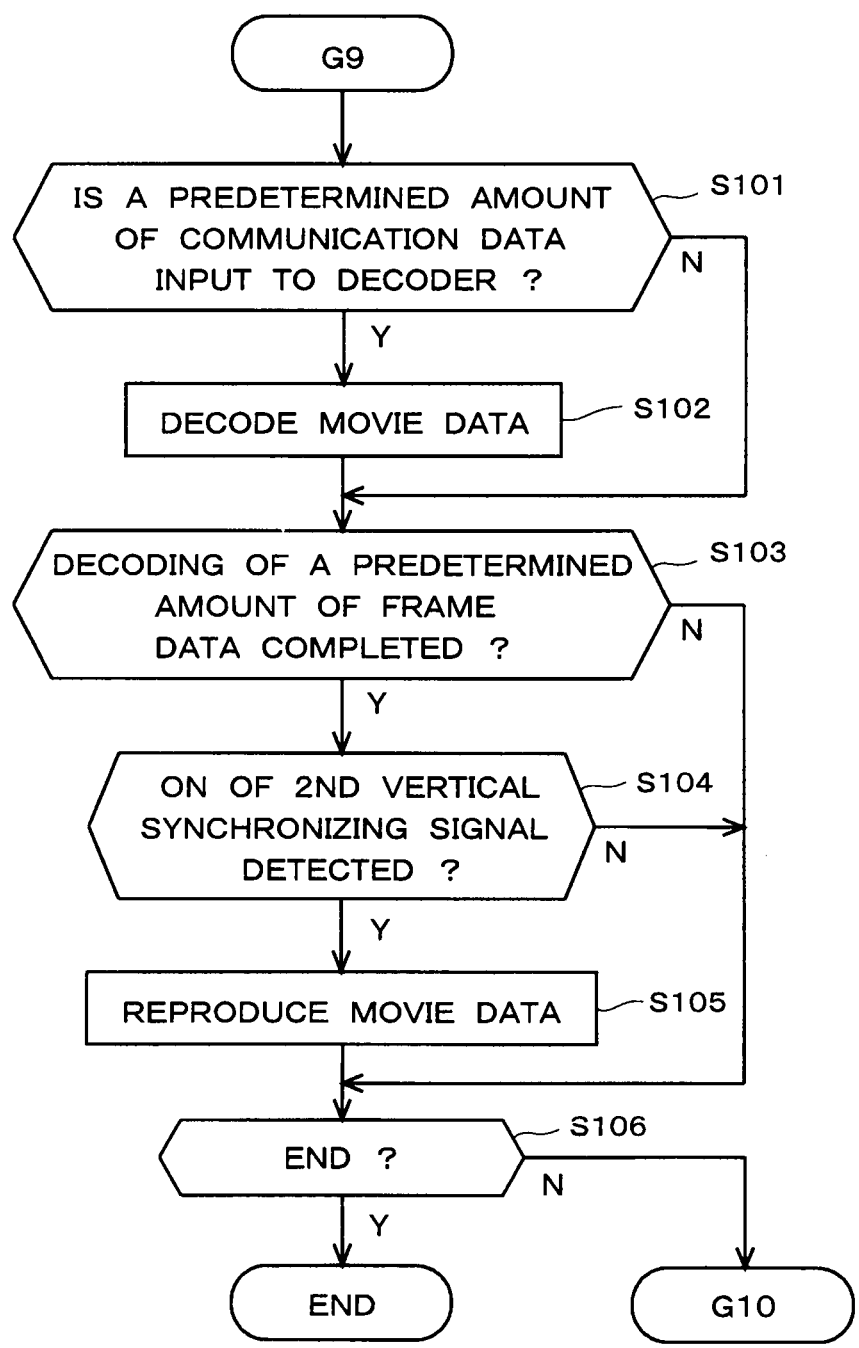
FIG. 18 is a flowchart showing operations of the extenuation unit 3 and the TV receiver 4 in the third embodiment.

FIGS. 17 and 18 are flowcharts showing operations of the extenuation unit 3 and the TV receiver 4 in the third embodiment.

When a power of the extension unit 3 is turned on, the oscillator of the clock 37 starts self-oscillation, thereby the clock 37 starts generation of the second vertical synchronizing signal (Step S91) and the communication unit 33 of the extension unit 3 is placed in a state for monitoring whether or not arrival of communication data is detected (Step S92).

When arrival of communication data is detected, the communication unit 33 determines to be Yes in Step S92 and receives that communication data (Step S93). More specifically, by Step S93, receiving of the communication data is started.

When no communication data is detected (No in Step S92), Steps S101 to S106 are performed. Those processes can be performed in the same manner as Steps S71 to S76 in the second embodiment and therefore the description thereof is omitted.

Then, the CPU 30 determines whether or not the header is included in the communication data received in Step S93 (Step S94). In a case where the header is not included in the communication data, the movie reproduction system 1 performs the aforementioned processes of Step S101 to S106.

In a case where the header is included in the communication data received in Step S93 (Yes in Step S94), the timing signal is turned ON at that time, and the time at which the header has been received is sent to the decoder 35a.

The processes of Steps S95 to S99 after generation of the timing signal by the CPU 30 can be performed in the same manner as Steps S65 to S69 in the second embodiment, and therefore the description thereof is omitted.

As described above, in the movie reproduction system 1 in the third embodiment, the movie data 5 received as the communication data by the communication unit 33 is also used as the frame timing data, and the decoder 35a generates the second vertical synchronizing signal in accordance with the time of receiving of the movie data 5. Thus, the same effects as those of the second embodiment can be obtained. Moreover, is it not necessary to send the frame timing data as the communication data separately. Thus, the system can be easily implemented.

Moreover, the movie data 5 which also used as the frame timing data is a leading portion of the movie data 5 (header data). Thus, accuracy can be improved by using the portion in which an error of the delay time is small as the frame timing data. Please note that a portion of the movie data 5 which is also used as the frame timing data is not limited to a leading portion. For example, a last portion of the movie data 5 may be used as the frame timing data.

4. Fourth Embodiment

It has been described that the movie reproduction systems 1 in the above embodiments each includes the TV receiver 4 and reproduces movie data 5 on the TV receiver 4. In other words, exemplary structures have been described in which a TV set at home can be also used as the TV receiver 4 in the movie reproduction system 1.

However, it is not always necessary for the movie reproduction system 1 to reproduce a video in a home-use TV set. For example, the movie data 5 can be reproduced by a structure including a dedicated display unit.

Figure 19:
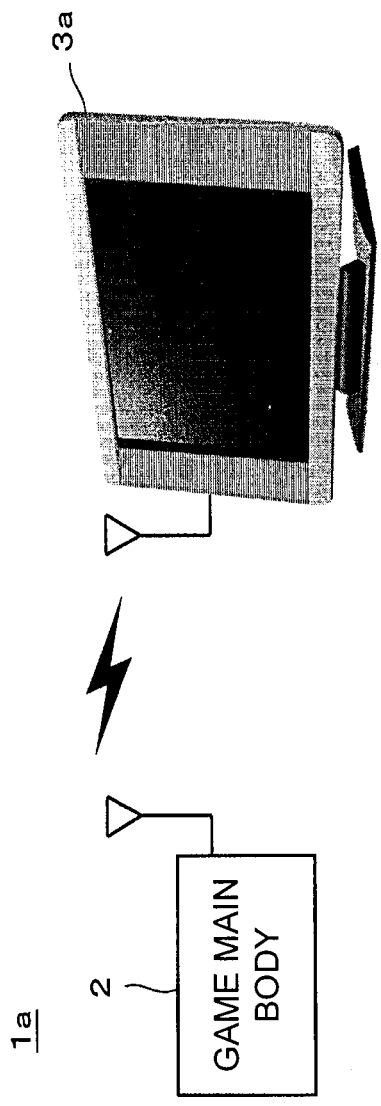
FIG. 19 is a diagram showing a movie reproduction system in the fourth embodiment.

FIG. 19 is a diagram showing a movie reproduction system 1a in the fourth embodiment. The movie reproduction system 1a is different from the movie reproduction systems 1 in the above embodiments in that it includes an extension unit 3a instead of the extension unit 3. In the following, the structure in the movie reproduction system 1a in the fourth embodiment which has the same function as that in the movie reproduction system 1 in the second embodiment is labeled with the same reference sign, and the description thereof is omitted in an appropriate manner.

Figure 20:
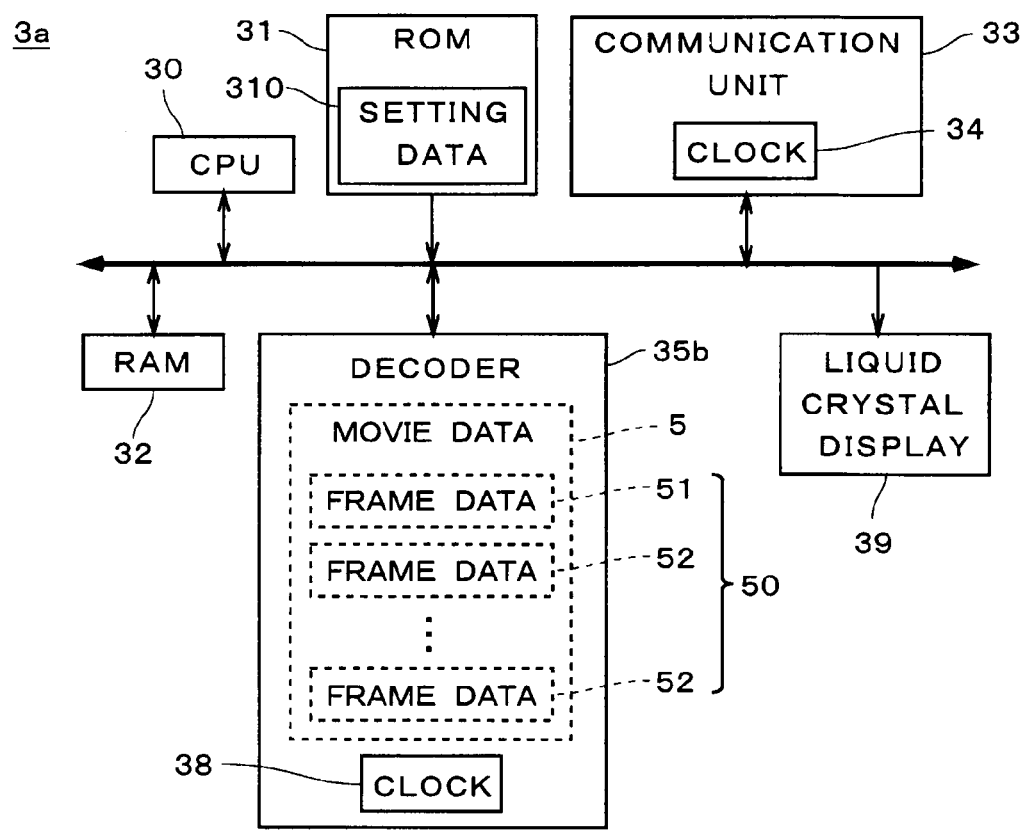
FIG. 20 is a block diagram showing the structure of the extension unit in the fourth embodiment.

FIG. 20 is a block diagram showing the structure of the extension unit 3a in the fourth embodiment. The extension unit 3a is different from the extension unit 3 in the second embodiment in that the extension unit 3a includes a decoder 35b instead of the decoder 35a and also includes an liquid crystal display 39.

The liquid crystal display 39 has a function of displaying an image (especially movie data 5) on its screen and is a dedicated display unit in the movie reproduction system 1a (extension unit 3a). That is, the movie reproduction system 1a in the fourth embodiment is arranged as a system including a dedicated liquid crystal display 39 instead of the TV set at home (TV receiver 4).

The decoder 35b is different from the decoder 35a in the second embodiment in that the decoder 35b includes a clock 38 instead of the clock 37.

In a case of using a TV set at home as a reproduction device, a video signal (movie data 5) supplied thereto should conform to standards. For example, some error in the clock frequency is acceptable, but the number of clocks in a vertical synchronizing signal should be fixed in accordance with the standard. Therefore, in the first to third embodiments, the structures are mainly described in which the clock frequency is controlled by using VCXO for the clock 26, 34 or 37, for example, in order to control the number of clocks in the vertical synchronizing signal with high accuracy.

In the movie reproduction system 1a in the fourth embodiment, however, a dedicated liquid crystal display 39 is provided, as described before. With the dedicated liquid crystal display 39, the system can be arranged such that, even in a case where the number of the clocks in the vertical synchronizing signal (the second vertical synchronizing signal) is varied in every frame, it is possible to display movie data 5. (In other words, unlike the TV receiver 4, the number of the clocks in each frame is not necessarily fixed.)

Therefore, the movie reproduction system 1a (clock 38) in the fourth embodiment can lower the frequency of the second vertical synchronizing signal by increasing the number of the clocks in the second vertical synchronizing signal and can increase the frequency of the second vertical synchronizing signal by reducing the number of the clocks of the second vertical synchronizing signal.

That is, when the upper limit determination signal input from the comparator 356 is in ON state, the control circuit of the clock 38 does not control the oscillator to lower the frequency by lowering the control voltage like the control circuit of the clock 37, but increases the number of the clocks in the second vertical signal for each frame. Thus, the frequency of the second vertical synchronizing signal is lowered, resulting in making the delay of the second vertical synchronizing signal with respect to the timing signal larger. Therefore, the "delay" of the timing signal with respect to the second vertical synchronizing signal becomes smaller. The clock 38 continues to perform this control until the "delay" becomes a level equal to or smaller than the upper limit of the threshold values.

When the lower limit determination signal input from the comparator 356 is ON state, the control circuit of the clock 38 does not control the oscillator to increase the frequency by making the control voltage higher like the control circuit of the clock 37, but reduces the number of the clocks in the second vertical signal for each frame. Thus, the frequency of the second vertical synchronizing signal becomes higher, resulting in making the delay of the second vertical synchronizing signal with respect to the timing signal smaller. Therefore, the "delay" of the timing signal with respect to the second vertical synchronizing signal becomes larger. The clock 38 continues to perform this control until the "delay" reaches a level equal to or larger than the lower limit of the threshold values.

Next, it is described how the control circuit of the clock 38 increases/reduces the number of the clocks in the second vertical synchronizing signal for each frame. Three techniques are mainly considered.

The first technique is to increase/reduce the number of horizontal synchronizing signals in the second vertical synchronizing signal. One period of the second vertical synchronizing signal is formed by a plurality of horizontal synchronizing signals. Thus, when one period of the second vertical synchronizing signal is formed by n horizontal synchronizing signals (where n is natural number equal to or larger than 2), for example, the number of the horizontal synchronizing signals is reduced so that (n−1) horizontal synchronizing signals form one period of the second vertical synchronizing signal. Consequently, the number of the clocks included in one period of the second vertical synchronizing signal is reduced, and the frequency of the second vertical synchronizing signal becomes higher. According to this technique, the number of the clocks in the horizontal synchronizing signal can be kept constant.

The second technique is to increase/reduce the number of the clocks included in one period of the horizontal synchronizing signal without changing the number of the horizontal synchronizing signals included in one period of the second vertical synchronizing signal. For example, in a case where one period of the horizontal synchronizing signal is formed by m clocks (where m is natural number equal to or larger than 2), the number of the clocks for one, two or more, or all of n horizontal synchronizing signals included in one period of the second vertical synchronizing signal is reduced to (m−1). Consequently, the number of the clocks included in one period of the second vertical synchronizing signal is reduced and the frequency of the second vertical synchronizing signal becomes higher. According to this technique, highly accurate control is possible.

The third technique is a modification of the second technique and to increase/reduce the number of the clocks of the horizontal synchronizing signal in a vertical blanking period. The vertical blanking period is a period after drawing is completed in presentation of an image. Therefore, changing the number of the clocks of the horizontal vertical signal only in this period can suppress effects of disorder of the horizontal synchronizing signal during the drawing.

Any one of those three techniques may be chosen and used or two or more of those may be used at the same time. For example, the number of the horizontal synchronizing signals included in one period of the second vertical synchronizing signal is increased/reduced, and the number of the clocks in the horizontal synchronizing signals may be increased/reduced at the same time. Alternatively, the number of the horizontal synchronizing signals may be reduced when the frequency of the second vertical synchronizing signal is made higher, whereas the number of the clocks included in the horizontal synchronizing signal may be increased when the frequency of the second vertical synchronizing signal is made lower.

As described above, also in the fourth embodiment, the second vertical synchronizing signal having an increased shift with respect to the first vertical synchronizing signal (timing signal) is corrected to suppress that shift by the clock 38 in accordance with the output signals from the comparator 356, as in the second embodiment. Thus, in the movie reproduction system 1a in the fourth embodiment, instead of a clock provided with VCXO (a clock in which the oscillator frequency can be controlled) which is relatively expensive hardware, a clock using another technique which is formed by inexpensive hardware (e.g., a clock provided with an oscillator having a fixed frequency) can be used as the clock 38. Therefore, the cost can be suppressed. Moreover, by controlling the number of the clocks directly, the second vertical synchronizing signal can be easily controlled.

It should be noted that the operation of the movie reproduction system 1a in the fourth embodiment can be implemented in the same manner as that of the movie reproduction system 1 in the second embodiment, for example, and therefore the description thereof is omitted.

Moreover, in the fourth embodiment, the liquid crystal display 39 is arranged as a device included within the extension unit 3a. However, the liquid crystal display 39 can be arranged to be connected to the outside of the extension unit 3a.

In addition, the fourth embodiment can be also implemented by the arrangement including the clock 37 instead of the clock 38 (i.e., the arrangement including the decoder 35a instead of the decoder 35b), although the effect of suppressing cost is reduced.

5. Fifth Embodiment

In the aforementioned second to fourth embodiments, examples are described in which the frame timing data is transmitted and the vertical synchronizing signal on the generation side and the vertical synchronizing signal on the reproduction side are made synchronized with each other in accordance with the time of arrival of that frame timing data. However, the technique for synchronizing the first vertical synchronizing signal and the second vertical synchronizing signal with each other is not limited to the examples shown in the above embodiments.

Figure 21:
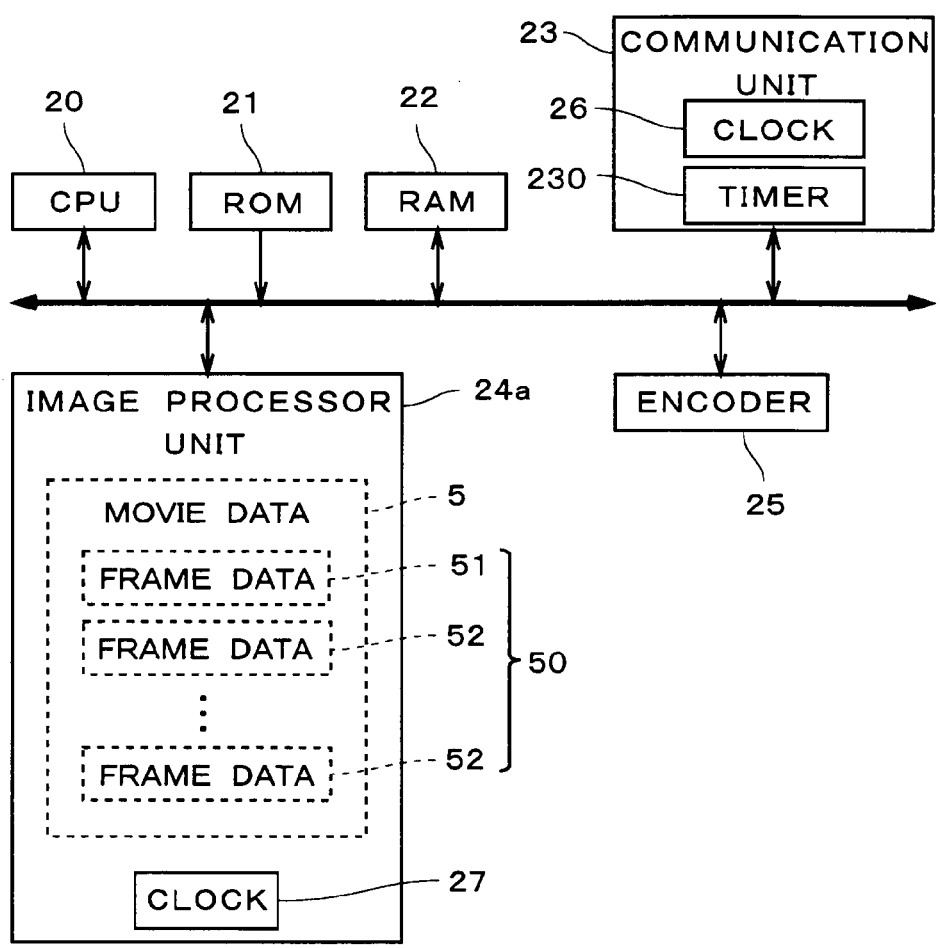
FIG. 21 is a block diagram showing the structure of the game main body in the fifth embodiment.
Figure 2:
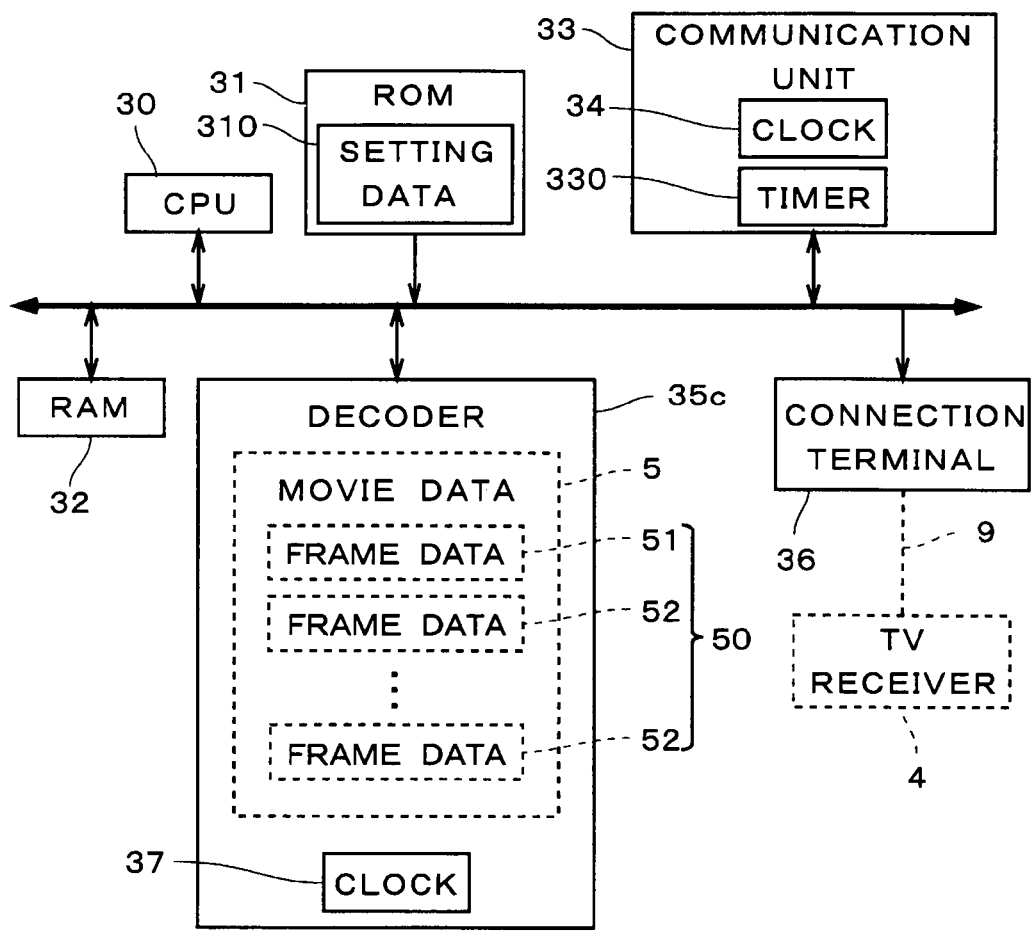

FIG. 21 is a block diagram showing the structure of the game main body 2 in the fifth embodiment. FIG. 22 is a block diagram showing the structure of the extension unit 3 in the fifth embodiment.

In the following description, in the movie reproduction system 1 in the fifth embodiment, the structure having the same function as that in the movie reproduction system 1 in the second embodiment is labeled with the same reference sign and the description thereof is omitted in an appropriate manner.

Although the description of the communication unit 23 in the second embodiment is omitted, the communication unit 23 of the game main body 2 in the fifth embodiment includes a timer 230 (sending-side timer) for measuring time, as shown in FIG. 21. Similarly, as shown in FIG. 22, the communication unit 33 of the extension unit 3 in the fifth embodiment includes a timer 330 (receiving-side timer).

After communication between the game main body 2 and the extension unit 3 is established, the communication unit 23 and the communication unit 33 synchronize the timer 230 and the timer 330 respectively included therein with each other. Then, the game main body 2 makes the value of the timer 230 be included in a beacon which is sent to the extension unit 3 regularly, and sends that beacon to the extension unit 3. The extension unit 3 sets the value of the timer 330 of the communication unit 33 to the value of the timer 230 included in the beacon received from the game main body 2.

Thus, synchronization between the timer 230 and the timer 330 is maintained and it is possible that the game main body 2 and the extension unit 3 have the same time information in common. In the following, the description is made assuming that the timer 230 and the timer 330 are synchronized with each other, unless specified otherwise.

The communication unit 23 in the fifth embodiment makes the value of the timer 230 at a time at which the first vertical synchronizing signal input from the image processor unit 24a is turned ON be included in the frame timing data, and sends it to the extension unit 3 as communication data. This frame timing data is sent separately from the communication data of the movie data 5, with higher priority than the communication data of the movie data 5. It should be noted that, as in the third embodiment, the system in the fifth embodiment may be arranged such that the frame timing data including the value of the timer 230 is sent together with the movie data 5.

Figure 23:
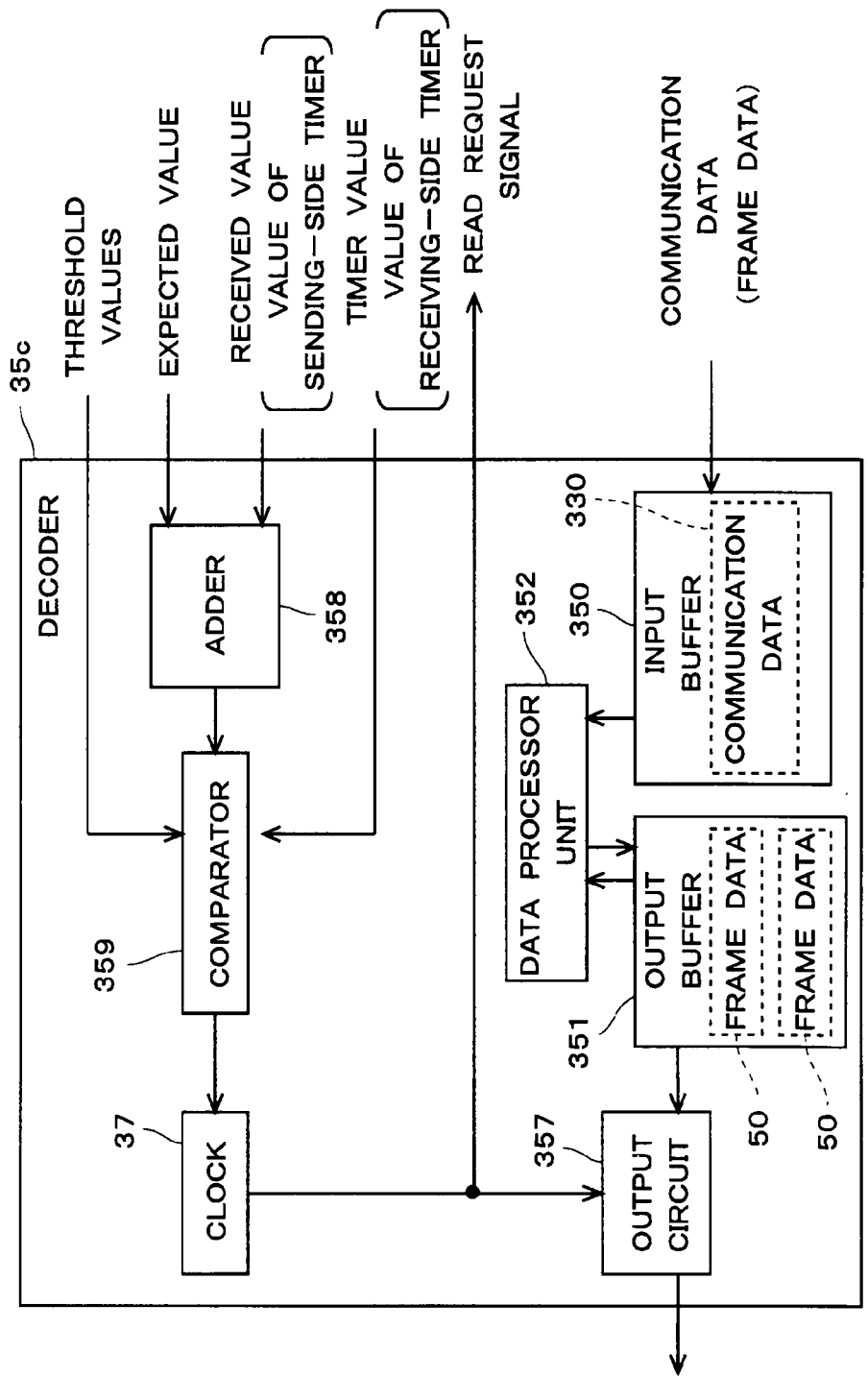
FIG. 23 is a diagram showing the structure of a decoder in the fifth embodiment.

FIG. 23 is a diagram showing the structure of a decoder 35c in the fifth embodiment. The decoder 35c in the fifth embodiment is different from the decoder 35a in the second embodiment in that the decoder 35c includes an adder 358 and a comparator 359 instead of the timer 355 and the comparator 356.

The decoder 35c outputs the output signal (the second vertical synchronizing signal) from the clock 37 as a read request signal. In response to this read request signal, the value of the timer 330 is read from the communication unit 33. The value of the timer 330 thus read is input to the decoder 35c (comparator 359) as "a timer value (a receiving-side timer value)" shown in FIG. 23. In this manner, the extension unit 3 in the fifth embodiment reads the value of the timer 330 at a timing of the second vertical synchronizing signal thereof and inputs it to the comparator 359.

In addition, every time the extension unit 3 receives the frame timing data, the value of the timer 230 included in that frame timing data is input to the decoder 35c as "a received value (sending-side timer value)" shown in FIG. 23. More specifically, this "received value" is input to the adder 358 of the decoder 35c.

The adder 358 adds the "received value" input thereto to an expected value (an expected value of a delay time required for processing) stored in the setting data 310, and outputs a value obtained by addition (an added value) to the comparator 359. In the present embodiment, the received value is the value of the timer 230 at the time of start of generation of the frame data 50.

Thus, the added value which the adder 358 obtains by adding the expected value to the received value is the value of the timer 230 at a time at which it is expected that processing of the frame data 50 is completed and presentation becomes available. Please note that the timer 230 and the timer 330 are synchronized with each other as described before and therefore the value of the timer 230 is equivalent to the value of the timer 330.

The comparator 359 compares the timer value input from the timer 330 and the added value input from the adder 358 to each other. The timer value input from the timer 330 to the comparator 359 is the value of the timer 330 at a time at which the second vertical synchronizing signal is turned ON. The added value input from the adder 358 is the value of the timer 330 at a time at which the second vertical synchronizing value is to be turned ON.

The comparator 359 also has a function of evaluating a shift between the timer value and the added value based on the threshold values (setting data 310). In a case where the timer value is larger than the added value and the threshold value (upper limit), the comparator 359 turns the upper limit determination signal ON and transmits it to the clock 37. In a case where the timer value is smaller than the added value and the threshold value (lower limit), the comparator 359 turns the lower limit determination signal ON and transmits it to the clock 37.

That is, in the comparator 359 in the fifth embodiment, the upper limit determination signal is turned ON in a case where the delay of the second vertical synchronizing signal is larger than an acceptable range (the delay is larger than the expected value), and the lower limit determination signal is turned ON in a case where the delay of the second vertical synchronizing signal is smaller than the acceptable range (the delay is smaller than the expected value).

When the upper limit determination signal input from the comparator 359 is in ON state, the clock 37 in the fifth embodiment makes the control voltage higher, thereby controlling the oscillator to increase the frequency. Thus, the frequency of the second vertical synchronizing signal is increased and therefore the delay of the second vertical synchronizing signal can be made small. This control continues to be performed until the "delay" reaches a level equal to or smaller than the upper limit of the threshold values.

Moreover, when the lower limit determination signal input from the comparator 359 is in ON state, the clock 37 in the fifth embodiment lowers the control voltage, thereby controlling the oscillator to lower the frequency. Thus, the frequency of the second vertical synchronizing signal is lowered and therefore the delay of the second vertical synchronizing signal can be made larger. This control continues to be performed until the "delay" reaches a level equal to or larger than the lower limit of the threshold values.

A movie reproduction method implemented by the above-described movie reproduction system 1 in the fifth embodiment is described. However, the operation of the game main body 2 in the fifth embodiment can be implemented in the same manner as the operation in the second embodiment (FIGS. 12 and 13) except that the value of the timer 230 is stored in frame timing data when the frame timing data is generated. Therefore, the description of the operation of the game main body 2 is omitted.

Figure 24:
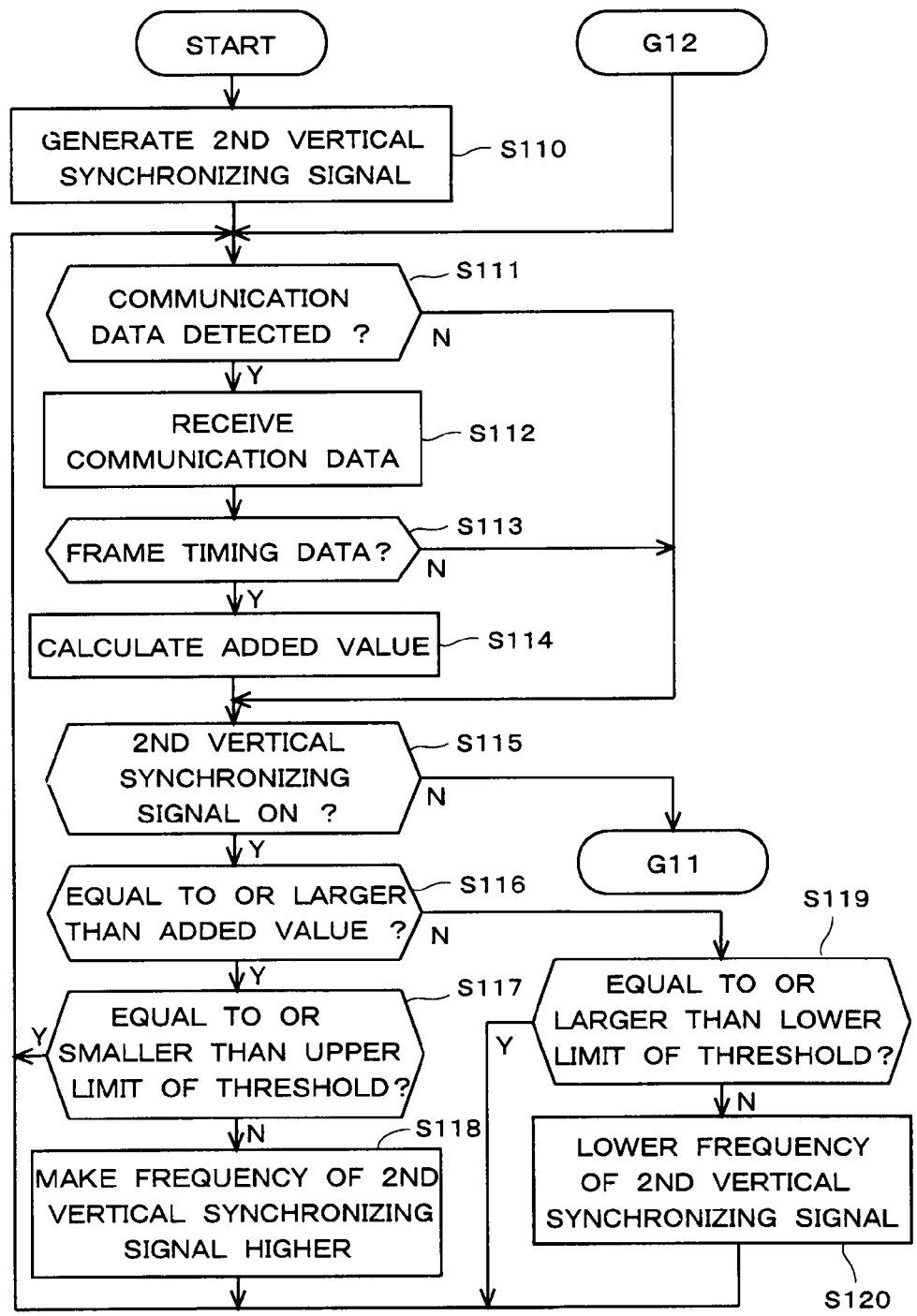
FIG. 24 is a flowchart showing operations of the extension unit in the fifth embodiment.
Figure 25:
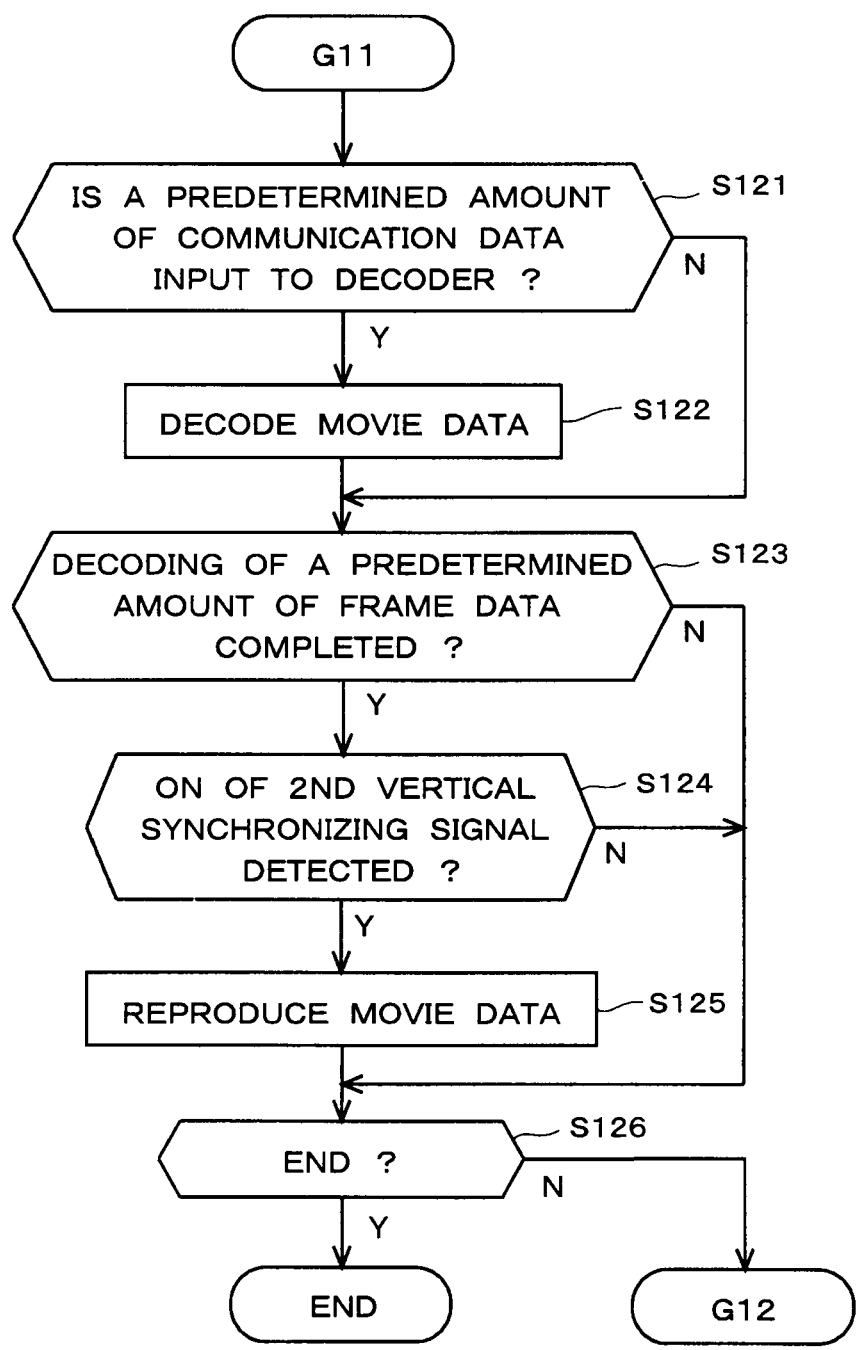
FIG. 25 is a flowchart showing operations of the extension unit in the fifth embodiment.
Figure 26:
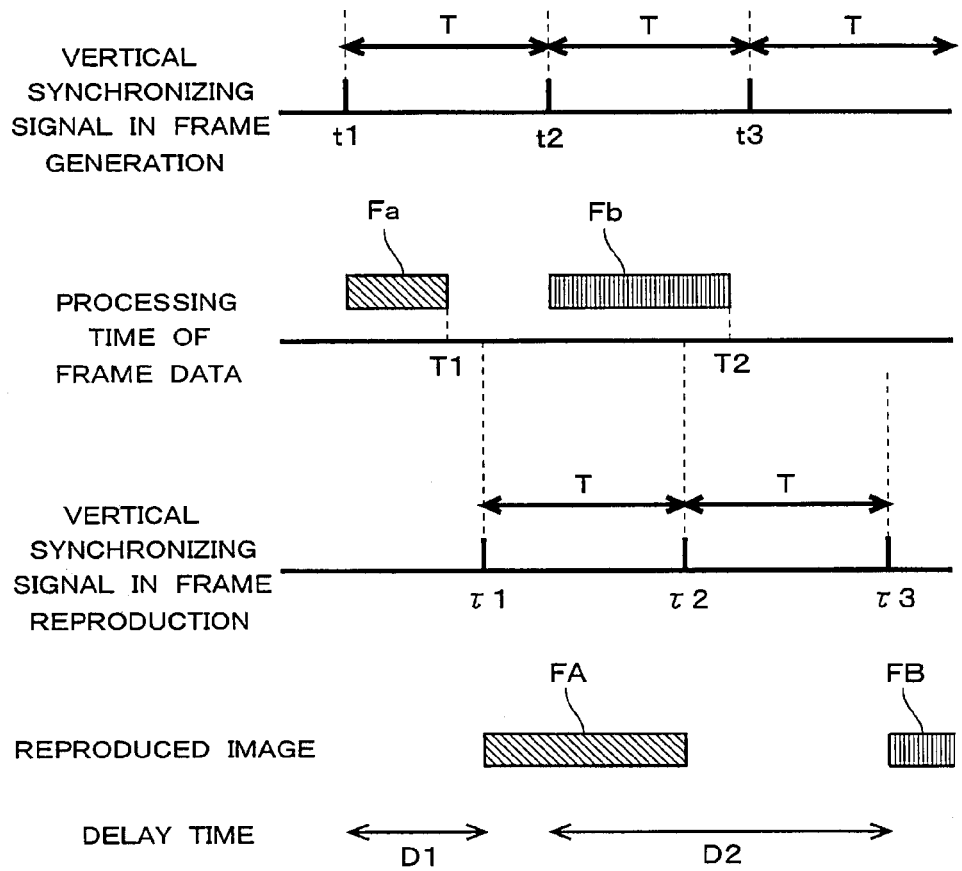
FIG. 26 is a diagram illustrating the conventional technique.

FIGS. 24 and 25 are flowcharts showing operations of the extension unit 3 in the fifth embodiment. In the extension unit 3 in the fifth embodiment, ON/OFF states of the second vertical synchronizing signal are monitored (Step S115). Steps S110 to S113 shown in FIG. 24 can be performed in the same manner as Steps S61 to S64 (FIG. 14) already described in the second embodiment and therefore the description thereof is omitted. Moreover, Steps S121 to S126 shown in FIG. 25 can be performed in the same manner as Steps S71 to S76 (FIG. 15) already described in the second embodiment and therefore the description thereof is omitted.

In a case where the received communication data is frame timing data (Yes in Step S113), the value of the timer 230 included in that frame timing data is input to the decoder 35c (adder 358) as a received value. Thus, the adder 358 calculates an added value based on the received value and the expected value (Step S114). The added value calculated by the adder 358 is output to the comparator 359.

When the second vertical synchronizing signal is turned ON (Yes in Step S115), in response to this the value of the timer 330 is read out and input to the decoder 35c (comparator 359). Thus, the comparator 359 determines whether or not the value of the timer 330 input thereto is equal to or larger than the added value (Step S116).

In a case where the value of the timer 330 is equal to or larger than the added value (Yes in Step S116), the comparator 359 determines whether or not a value obtained by subtracting the added value from the value of the timer 330 (a value indicating the shift of the second vertical synchronizing signal) is equal to or smaller than the upper limit of the threshold values (Step S117).

In Step S117, in a case where the value obtained by subtracting the added value from the value of the timer 330 is not equal to or smaller than the upper limit of the threshold values, the comparator 359 turns the upper limit determination signal ON and transmits it to the clock 37. Thus, the clock 37 controls the oscillator to increase the frequency of the second vertical synchronizing signal (Step S118). In a case where it is determined in Step S117 to be No, the extension unit 3 skips Step S118 and the second vertical synchronizing signal is maintained.

On the other hand, in a case where it is determined in Step S116 to be No (the value of the timer 330 is smaller than the added value), the comparator 359 determines whether or not a value obtained by subtracting the value of the timer 330 from the added value (a value indicating the shift of the second vertical synchronizing signal) is equal to or larger than the lower limit of the threshold values (Step S119).

In Step S119, in a case where the value obtained by subtracting the value of the timer 330 from the added value is not equal to or larger than the lower limit of the threshold values, the comparator 359 turns the lower limit determination signal ON and transmits it to the clock 37. Thus, the clock 37 controls the oscillator to lower the frequency of the second vertical synchronizing signal (Step S120). In a case where it is determined in Step S119 to be No, the extension unit 3 skips Step S120 and the second vertical synchronizing signal is maintained.

As described above, as in the movie reproduction system 1 in the fifth embodiment, by arranging the system such that the timers 230 and 330 are provided in the game main body 2 (sending side) and the extension unit 3 (receiving side), respectively and a time at which generation of frame data 50 is started is notified by the value of the timer 230 while the timers 230 and 330 are synchronized with each other, the same effects as those in the second embodiment can be obtained.

Also, by that arrangement, the movie reproduction system 1 in the fifth embodiment can adjust the second vertical synchronizing signal without being affected by the delay time caused by transmission of the frame timing data (the value of the timer 230).

In the fifth embodiment, when the second vertical synchronizing signal is turned ON while it has been already determined in Step S123 to be Yes, the processes in Steps S116 to S120 and the process in Step S125 are performed in parallel, although those processes are described separately from each other for the sake of convenience of the description.

Moreover, the system 1 may be arranged to include the liquid crystal display 39 in the fourth embodiment instead of the TV receiver 4 and the clock 38 in the fourth embodiment instead of the clock 37 in the fifth embodiment.

6. Modifications

In the above, the embodiments of the present invention are described. However, the present invention is not limited to the above embodiments but various modifications can be made.

For example, in the above embodiments, it is described the structures implementing WiFi standards are used as the communication unit 23 and the communication unit 33. However, the communication unit 23 and the communication unit 33 are not limited thereto. Other standards (e.g., infrared communication) may be used.

Moreover, in the above embodiments, a movie (game screen) generated by a game program in accordance with a user's operation or the like is described as an example. However, the movie may be real images captured by a video camera, for example. That is, the movie reproduction system 1 may be arranged as a system for sending the movie captured by the video camera via wireless communication and receiving and reproducing it at a remote location.

The processes in the above embodiments are merely examples. The contents and orders are not limited thereto. That is, the processes may be modified in an appropriate manner, as long as the same effects can be obtained.

In the second embodiment, it is described that generation of the second vertical synchronizing signal by the clock 37 is started by self-oscillation of the oscillator of the clock 37. By arranging in this manner, the time for starting generation of the second vertical synchronizing signal is unfixed with respect to the first vertical synchronizing signal in the second embodiment. However, the system may be arranged such that the time for starting generation of the second vertical synchronizing signal is determined in accordance with a time at which the timing signal in the second embodiment is turned ON for the first time (a time at which the first frame timing data is received). This is the same as in the third to fifth embodiments which are described as being the same as the second embodiment.

The invention claimed is:

1. A movie reproduction system comprising:
a transmitter configured to send data, the transmitter including a first communication clock;
a receiver configured to receive the data, the receiver including a second communication clock that is synchronized with the first communication clock;
a first signal generator configured to generate a first vertical synchronizing signal that is synchronized with the first communication clock of the transmitter;
an image processor configured to generate movie data representing a movie including a plurality of frames in accordance with the first vertical synchronizing signal generated by the first signal generator, wherein the transmitter sends the generated movie data and start time data to the receiver, the start time data indicating a time at which the image processor started generating the movie data;
a second signal generator configured to output a second vertical synchronizing signal in accordance with the start time data received by the receiver, the second vertical synchronizing signal being synchronized with the second communication clock of the receiver; and
an image reproducer configured to present, the movie data received by the receiver, in such a manner that each of the frames included in the movie is presented in synchronization with the second vertical synchronizing signal output by the second signal generator.

2. The movie reproduction system recited in claim 1, wherein the transmitter sends the start time data and the movie data separately from each other.

3. The movie reproduction system recited in claim 2, wherein the transmitter sends the start time data with higher priority than the movie data.

4. The movie reproduction system recited in claim 1, wherein:
the second signal generator generates the second vertical synchronizing signal based on a predetermined expected value and the start time data received from the transmitter, and
the expected value is predetermined based on a time required to complete processing the movie data received by the receiver.

5. The movie reproduction system recited in claim 4, wherein
when generating the second vertical synchronizing signal, the second signal generator generates a delay relative to a time corresponding to the start time data, the delay being generated based on the expected value.

6. A movie reproduction system for sending/receiving movie data representing a movie and reproducing the movie, the system comprising:
a transmitter configured to send data;
a receiver configured to receive the data;
a first signal generator configured to generate a first vertical synchronizing signal; and
an image processor configured to generate frame data in accordance with the first vertical synchronizing signal generated by the first signal generator, thereby generating movie data representing the movie, wherein
the transmitter sends frame timing data indicating a time at which the image processor started generating the frame data;
a second signal generator configured to generate a second vertical synchronizing signal in accordance with the frame timing data received by the receiver; and
an image reproducer configured to present the frame data included in the movie data received by the receiver in accordance with the second vertical synchronizing signal generated by the second signal generator, thereby reproducing the movie represented by the movie data.

7. The movie reproduction system recited in claim 6, wherein the transmitter sends the frame timing data and the movie data separately from each other.

8. The movie reproduction system recited in claim 7, wherein the transmitter sends the frame timing data with priority than the movie data.

9. The movie reproduction system recited in claim 6, wherein:
the movie data received by the receiver is also used as the frame timing data, and
the second signal generator generates the second vertical synchronizing signal in accordance with a receiving time of the movie data.

10. The movie reproduction system recited in claim 9, wherein the movie data also used as the frame timing data is a leading portion of the movie data.

11. The movie reproduction system recited in claim 6, wherein:
the image reproducer presents the frame data included in the movie data even when the number of clocks in the second vertical synchronizing signal for each frame is changed, and
the second signal generator generates the second vertical synchronizing signal while controlling the second vertical synchronizing signal by increasing or reducing the number of the clocks in the second vertical synchronizing signal for each frame.

12. The movie reproduction system recited in claim 6, further comprising:
a sending-side timer; and
a receiving-side timer, wherein
the frame timing data includes a value of the sending-side timer, and
the second signal generator generates the second vertical synchronizing signal in accordance with the value of the sending-side timer included in the frame timing data and a value of the receiving-side timer.

13. The movie reproduction system recited in claim 6, wherein:
the second signal generator generates the second vertical synchronizing signal based on a predetermined expected value and the frame timing data received from the transmitter, and the expected value is predetermined based on a time required to complete processing the movie data received by the receiver.

14. The movie reproduction system recited in claim 13, wherein
when generating the second vertical synchronizing signal, the second signal generator generates a delay relative to a time corresponding to the frame timing data, the delay being generated based on the expected value.

15. A movie reproduction method for reproducing a movie, the method comprising:
synchronizing a first communication clock of a transmitter and a second communication clock of a receiver with each other;
generating a first vertical synchronizing signal in accordance with the first communication clock of the transmitter;
generating movie data representing the movie by generating frame data in accordance with the first vertical synchronizing signal;
sending, to the receiver by the transmitter, the movie data and start time data indicating a time at which generation of the movie data started;
receiving, at the receiver, the movie data and the start time data sent by the transmitter;
generating a second vertical synchronizing signal in accordance with the second communication clock of the receiver and the start time data received by the receiver; and
reproducing the movie represented by the movie data by presenting frame data included in the received movie data in accordance with the second vertical synchronizing signal.

16. The movie reproduction method recited in claim 15, wherein:
the second vertical synchronizing signal is generated based on a predetermined expected value and the received start time data, and
the expected value is predetermined based on a time required to complete processing the received movie data.

17. A movie reproduction method for reproducing a movie, the method comprising:
generating a first vertical synchronizing signal;
generating movie data representing the movie by generating frame data in accordance with the first vertical synchronizing signal;
sending the movie data and frame timing data indicating a time at which generation of frame data for each frame constituting the movie data started;
receiving the movie data and the frame timing data;
generating a second vertical synchronizing signal in accordance with the received frame timing data; and
reproducing the movie represented by the movie data by presenting the frame data included in the movie data in accordance with the second vertical synchronizing signal.

18. The movie reproduction method recited in claim 17, wherein:
the second vertical synchronizing signal is generated based on a predetermined expected value and the received frame timing data, and
the expected value is predetermined based on a time required to complete processing the received movie data.

* * * * *

UNITED STATES PATENT AND TRADEMARK OFFICE
CERTIFICATE OF CORRECTION

| | | |
|---|---|---|
| PATENT NO. | : 8,582,033 B2 | Page 1 of 1 |
| APPLICATION NO. | : 13/318229 | |
| DATED | : November 12, 2013 | |
| INVENTOR(S) | : Takashi Sawada | |

It is certified that error appears in the above-identified patent and that said Letters Patent is hereby corrected as shown below:

On the title page, Item (54), and in the specification, Column 1, the Title is incorrect. Item (54) and Column 1 should read:

--MOVIE REPRODUCTION SYSTEM AND MOVIE REPRODUCTION METHOD FOR REDUCING DELAY TIME OF A REPRODUCED MOVIE--

Signed and Sealed this
Fourteenth Day of January, 2014

Michelle K. Lee
*Deputy Director of the United States Patent and Trademark Office*